United States Patent
Ryan

(10) Patent No.: US 11,670,184 B2
(45) Date of Patent: Jun. 6, 2023

(54) LEARNING SYSTEM THAT AUTOMATICALLY CONVERTS ENTERTAINMENT SCREEN TIME INTO LEARNING TIME

(71) Applicant: Justin Ryan, Bakersfield, CA (US)

(72) Inventor: Justin Ryan, Bakersfield, CA (US)

(*) Notice: Subject to any disclaimer, the term of this patent is extended or adjusted under 35 U.S.C. 154(b) by 0 days.

(21) Appl. No.: 17/851,003

(22) Filed: Jun. 27, 2022

(65) Prior Publication Data
US 2023/0042641 A1 Feb. 9, 2023

Related U.S. Application Data

(60) Provisional application No. 63/259,852, filed on Aug. 17, 2021, provisional application No. 63/259,551, filed on Jul. 22, 2021.

(51) Int. Cl.
*G09B 7/00* (2006.01)
*G09B 5/06* (2006.01)
*H04N 21/478* (2011.01)

(52) U.S. Cl.
CPC .......... *G09B 5/065* (2013.01); *H04N 21/478* (2013.01)

(58) Field of Classification Search
CPC ............ G09B 7/00; G09B 7/08; G09B 19/00
See application file for complete search history.

(56) References Cited

U.S. PATENT DOCUMENTS 5,944,530 A * 8/1999 Ho ........................ G09B 5/00
434/362
6,551,109 B1 * 4/2003 Rudmik ................... G09B 7/02
434/335
8,500,450 B1 8/2013 Taylor et al.
(Continued)

FOREIGN PATENT DOCUMENTS

WO 2020032965 A1 2/2020

OTHER PUBLICATIONS

International Search Report and Written Opinion of the International Searching Authority (ISA/US) dated Nov. 3, 2022 for International application PCT/US2022/035147 with an International filing date of Jun. 27, 2022, 8 pages.

*Primary Examiner* — Kurt Fernstrom
(74) *Attorney, Agent, or Firm* — Edward J. Radlo; Radlo & Su

(57) ABSTRACT

Children are spending an enormous amount of time on computer screens without receiving any educational benefit for doing so. The present invention advantageously Automatically Converts children's entertainment screen time into learning screen time. This is referred to as Auto-Conversion of Entertainment Screen Time into Learning Time. A novel Continuous Engagement Method During Learning keeps the learner engaged in academic functioning (where engagement would otherwise be continuously declining). The present invention solves a critical problem for special learners (e.g., those with ADHD, autism, dyslexia, or memory impairment) who have a high affinity for screen time and cannot access traditional reading instruction. An Artificial Intelligence (AI) architecture is used to customize the type of instruction the learner receives based upon academic progress and to customize delivery of the instruction itself by closely monitoring the learner's emotional mood state and sustained attention.

14 Claims, 29 Drawing Sheets

(56) References Cited

U.S. PATENT DOCUMENTS

| | | | | |
|---|---|---|---|---|
| 2006/0224046 | A1* | 10/2006 | Ramadas | A61B 5/16 |
| | | | | 600/300 |
| 2010/0235177 | A1* | 9/2010 | Wischmann | G16H 40/63 |
| | | | | 715/733 |
| 2010/0291528 | A1* | 11/2010 | Huerta | G09B 7/00 |
| | | | | 434/362 |
| 2012/0322041 | A1* | 12/2012 | Weisman | G09B 5/00 |
| | | | | 434/308 |
| 2016/0005326 | A1* | 1/2016 | Syrmis | G09B 7/00 |
| | | | | 434/362 |
| 2016/0156772 | A1* | 6/2016 | Zeilingold | H04M 1/72448 |
| | | | | 455/418 |
| 2017/0039876 | A1* | 2/2017 | Alyuz Civitci | G09B 7/00 |
| 2017/0042461 | A1* | 2/2017 | Hodas | A61B 5/4088 |
| 2017/0178526 | A1 | 6/2017 | Grimes et al. | |
| 2017/0358229 | A1 | 12/2017 | Kullok et al. | |
| 2017/0370741 | A1* | 12/2017 | Swaminathan | H04W 4/40 |
| 2018/0025050 | A1* | 1/2018 | Yadav | G09B 7/00 |
| | | | | 707/766 |
| 2018/0184964 | A1* | 7/2018 | Simon | A61B 5/162 |
| 2019/0026482 | A1* | 1/2019 | Kenny | G06Q 50/20 |
| 2019/0096279 | A1* | 3/2019 | Lau | G09B 19/00 |
| 2019/0159716 | A1* | 5/2019 | Alailima | G09B 5/00 |
| 2019/0216392 | A1* | 7/2019 | Bower | A61B 5/162 |
| 2019/0244127 | A1* | 8/2019 | Amado | G06V 30/40 |
| 2020/0046277 | A1 | 2/2020 | Dolsma et al. | |
| 2020/0105389 | A1* | 4/2020 | Garg | G06V 40/23 |
| 2020/0170560 | A1* | 6/2020 | Zakariaie | A61B 5/7264 |
| 2020/0178876 | A1* | 6/2020 | Lam | G16H 50/30 |
| 2020/0405213 | A1* | 12/2020 | Chappell, III | G16H 50/30 |
| 2021/0390876 | A1* | 12/2021 | Publicover | G06Q 50/20 |
| 2022/0054942 | A1 | 2/2022 | Tedesco | |

* cited by examiner

Learner Engaged in Entertainment Screen Time
(Prior Art)

Learner's View of Device

Transition Automaticity and Rapidity

Brief Teachings that Allow for
the Continuation of Sustained Attention

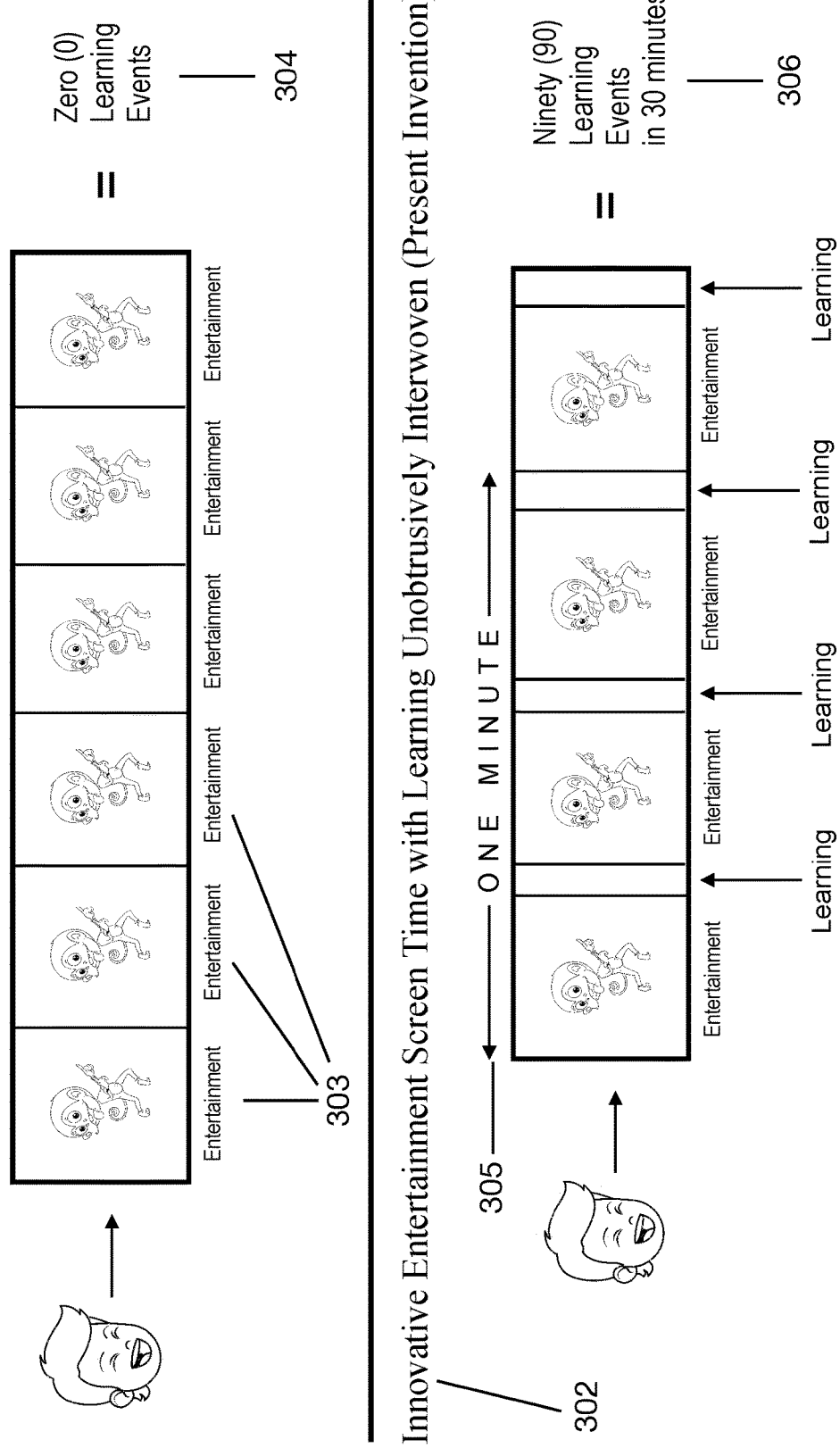

Fig. 5
Elapsed Time Method
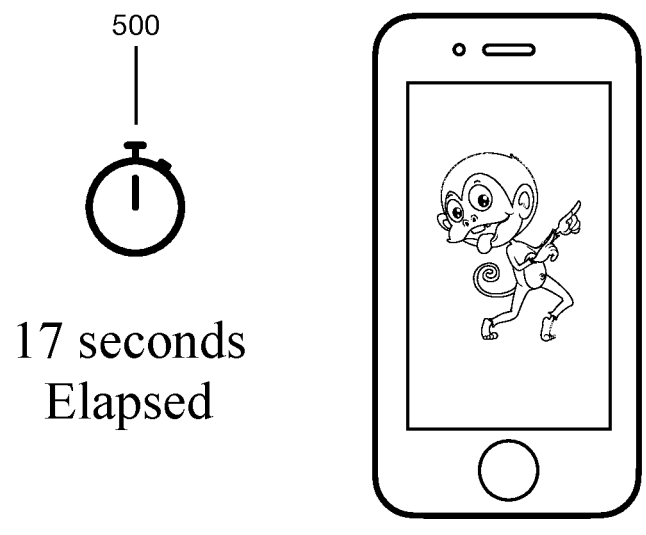
17 seconds Elapsed
< 1 second
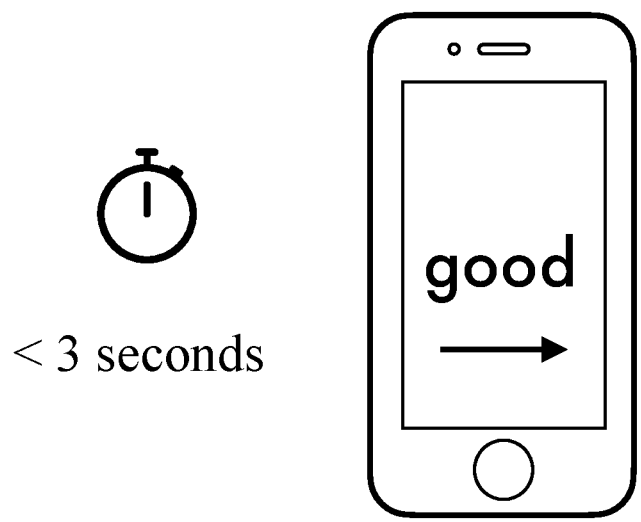
< 3 seconds Between Clips Method AI Understanding the User Neurochemicals and Learning Fig. 8 (B) - Exercise and Learning Fig. 9
Learner Data 1. Number of seconds for the learner to exhibit negative emotion from start of a single teaching point 2. Number of seconds for the learner to exhibit negative emotion from overall start of video/teaching session 3. Duration of learner's video viewing sessions 4. Total amount of viewing time per day 5. Time of day of learner's video viewing sessions 6. Time elapsed from presentation of answer choices and learner's entry response, associated with amount of time elapsed from overall start of video/teaching session 7. Percentage of answers correct, associated with each type of content 8. Number of repetitions required before answering a teaching item correct consistently, associated with each teaching method, and associated with "punchline" teaching events (e.g., did learner master teaching points more efficiently when learning event was presented immediately following laughter?)

9. Percentage of answers correct, associated with sessions that occurred during physical exercise 10. Percentage of answers correct, associated with each type of teaching method 11. Negative emotion events during Elapsed Time Method 12. Negative emotion events during Between Clips Method 13. Negative emotion events during Natural Stopping Point Method 14. Positive emotion events, associated with video type being watched 15. Positive emotion events, associated with length of video/teaching session Transition Back to the Entertainment Video Single User Input Quick Assessment With Single User Input Fig. 13
Continuation of Automatic Transitioning
and Continuous Engagement Method
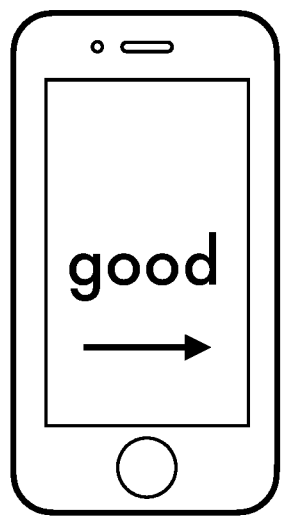
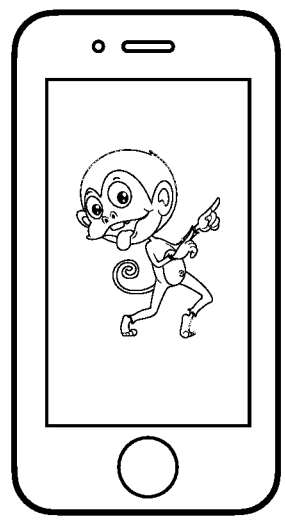

Declining Engagement Method (Prior Art)

Fig. 16
Side by Side Comparison
Figure 16 (a)
Declining Engagement Method
(Prior Art)
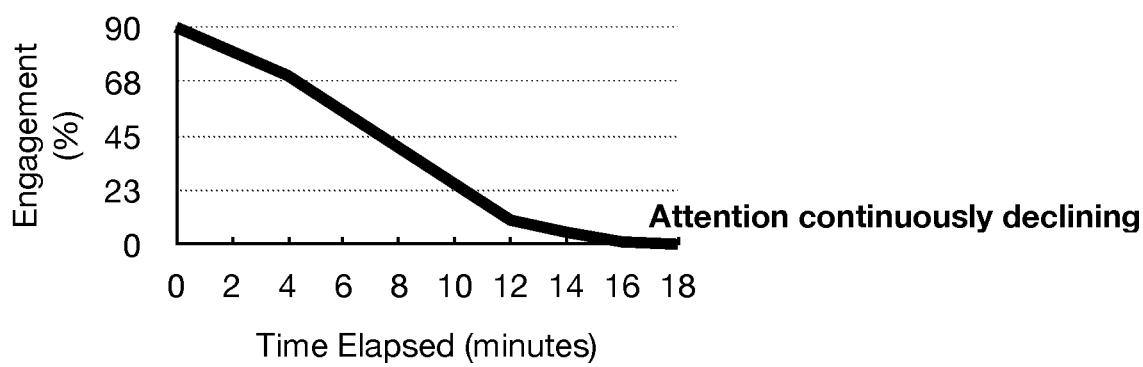
Figure 16 (b)
Continuous Engagement Method
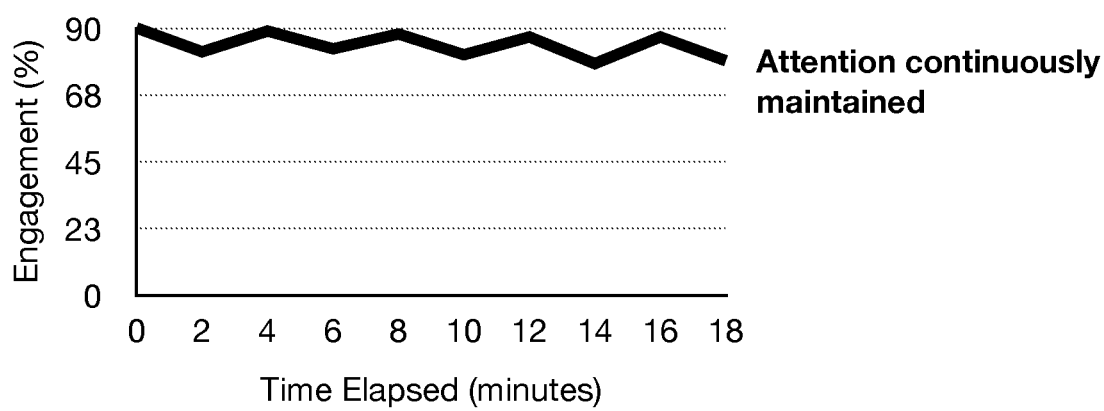

Traditional Method of Teaching
(Prior Art)

Continuous Engagement Method

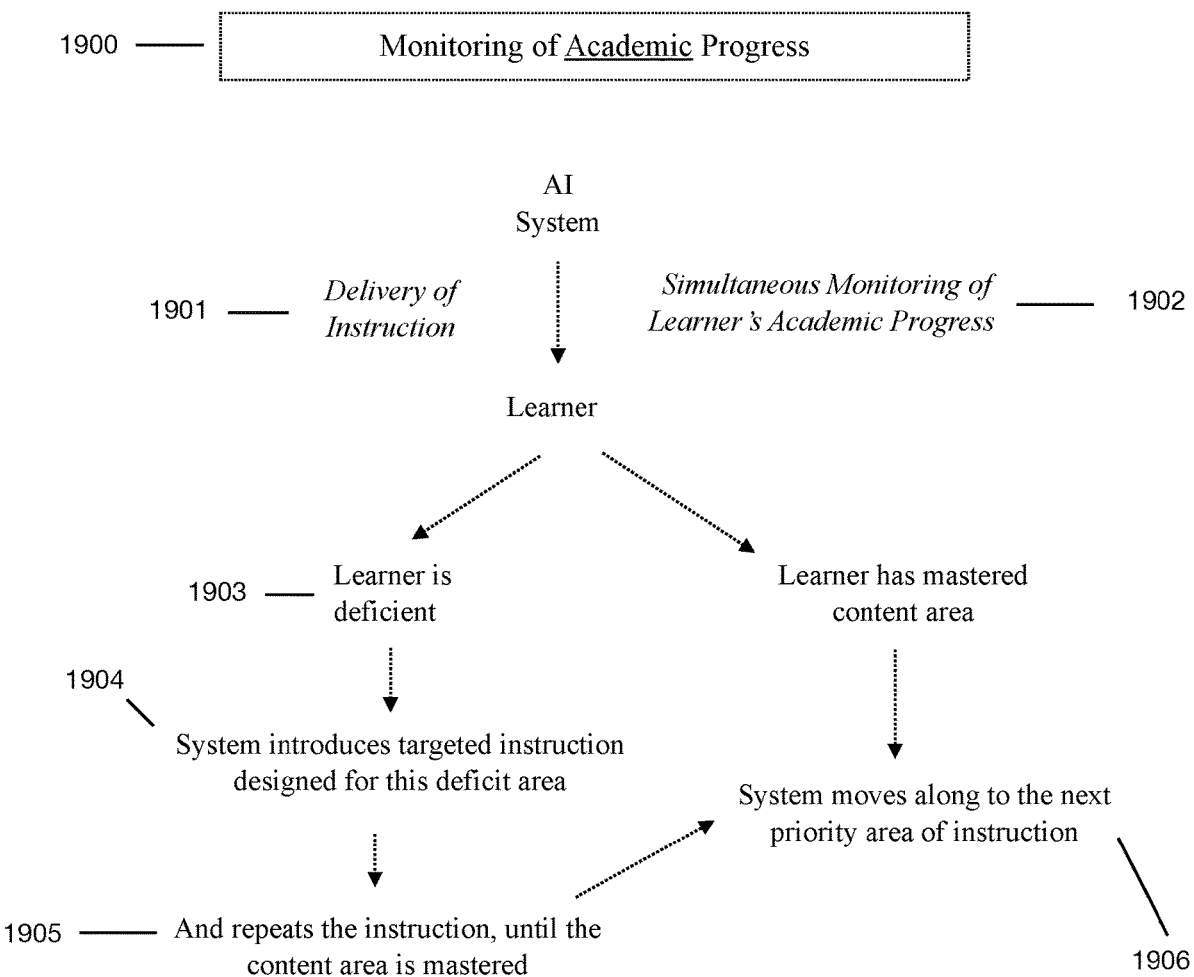

AI Architecture: High Level View

AI Architecture: Detailed View

Results, Data, and Modifications

Beginning of Targeted Instruction

Advanced Targeted Instruction

Fig. 24

Most Relevant Demographics

| Type of Learner | Nonexhaustive Examples | Efficacy & Usefulness of Invention |
|---|---|---|
| Special Needs (all ages) | Severe ADHD<br>Severe Autism<br>Severe Dyslexia<br>Severe Memory Impairment | Critically Useful |
| General Education (ages 3 to 8) | General education learners with normal learning profiles | Very Useful |
| General Education (ages 9 to 13) | General education learners with normal learning profiles | Useful |
| General Education (ages 14 to adult) | General education learners with normal learning profiles | Less Useful |
| General Education (ages 14 to adult) | Learners with specialized learning profiles (less severe ADHD, Autism, etc) | Useful for some learners |

LEARNING SYSTEM THAT AUTOMATICALLY CONVERTS ENTERTAINMENT SCREEN TIME INTO LEARNING TIME

RELATED APPLICATIONS

The present patent application claims the benefit of U.S. provisional patent application 63/259,551 filed Jul. 22, 2021 and U.S. provisional patent application 63/259,852 filed Aug. 17, 2021, both of which provisional patent applications are hereby incorporated into the present application in their entireties.

FIELD OF THE INVENTION

The field of this invention is that of creatively assisting learning, such as reading and learning a language, especially for normal children and special learners (e.g., those having ADHD, autism, dyslexia, memory impairment).

DESCRIPTION OF RELATED ART

Over the years, many innovators have done work in this domain. These achievements include a wide variety of approaches and solutions for the normally achieving reader and for the struggling special needs reader. In this application, the term "reader" also includes a learner who is learning a new language. To provide ease-of-reading, the word "reader" will be used, and this word will also include the learner who is learning a new language. For ease-of-reading, the word "reading" will also be used, and will include the process of learning a new language.

One example of a historic innovation is found in Taylor et al. (U.S. Pat. No. 8,500,450 B1 issued Aug. 6, 2013). This innovation developed methodologies for assessing a reader's current reading level, preparing appropriate content to develop new reading skills, customizing new content based upon how the reader responds to the reading program, and dynamically controlling selection of the content based upon the learner's performance.

A second historic example is found in Kullok et al. (U.S. published patent application 2017/035829 A1 published Dec. 14, 2017). These innovators utilized game- like tasks with moving objects and eye tracking to promote eye-hand coordination and recognition of sight words during periods of low physiological arousal.

A third example is found in Dolsma et al. (U.S. published patent application 2020/0046277A1 published Feb. 13, 2020). These innovators developed the novel element of delivering learning after using optical sensors to capture a subject's facial expression, eye movements, tone of voice, and related data. These data were utilized to estimate the subject's emotional and cognitive states and subsequently customize the learning session.

A fourth example is found in Tedesco (U.S. published patent application 2022/0054942 A1 published Feb. 24, 2022). This innovator developed a game to "increase attention ability" of a user during gameplay, while also using electroencephalography (EEG) data to evaluate the user's level of attention.

A fifth and final example summarizes the path innovative learning has taken over the last 300 years and why the present invention is needed to carry innovation forward. Bedor et al. (published PCT application WO 2020/032965 A1 published Feb.13, 2020) summarized this pathway in their patent application. Educational practices rooted in the Agricultural Revolution have been updated over the past 300 years in response to the Industrial Revolution. Educational methods started with textbooks, which progressed to information technology-based learning. Early forms of technology-based learning consisted of nothing more than creating screen-based versions of the printed content. Then innovation occurred, adding the features of record keeping, and notifications. Then, in the 1990's, learning management systems emerged. Learning management systems, however, have failed to transform the educational experience. These systems provide record keeping and notifications, but have not made innovative progress in the domain of creating highly engaging learning experiences that maximize learning and the joy of learning. Then, the innovative community turned to video games for inspiration when creating innovative educational materials. For the most part, this inspiration has culminated in mere "gamification" of prior educational materials. This step of gamifying existing materials can consist of the simple translation of textbooks into apps which involves only migrating from print formats (text books) to digital interfaces (phone screens), polishing the visual aesthetic by adding colorful graphics, animated characters, flashing pop-ups and other forms of interaction, and renaming quizzes as games. This is a thinly veiled effort to make the experience seem different, even though the underlying content has not been fundamentally reconfigured. This process has become obvious and has been conducted countless times in the K-6 curriculum, specifically in reading and math. Beyond grade 7, there are only a few examples of gamification that have achieved traction. Bedor et al. took innovation one step forward with its published patent application in 2020 (WO 2020/032965 A1 Feb.13, 2020) with the innovation of serious games: a type of learning game that is more than mere gamification. Serious games are strategy games that are created for scientific exploration and behavioral psychology experimentation, military simulations, as well as city planning, emergency management, and other socially embedded processes. Serious games are still a recent phenomenon, and they caused a significant innovative improvement to the creative educational landscape. And while serious games have made a significant innovative contribution to the marketplace, additional innovation has occurred in a completely different aspect of the creative educational arena.

The innovations summarized above, while making valuable contributions to the innovative landscape, have not addressed other crucial problems within the creative educational process.

Additional Relevant Background Pertaining to the Present Invention and the Problems it Solves Everywhere we go, we see children using technological devices. When at the grocery store we see children riding in shopping carts while holding a smart phone. In the car, or on a school bus, many kids use a device for entertainment. Many school districts have changed their bus-riding policies, now permitting children to use a device while riding the bus to and from school. With the advent of mobile technology, children's entertainment screen time has increased dramatically over the years.

There are two different types of screen time: 1) entertainment screen time, and 2) learning screen time. The most common example of entertainment screen time is a child watching a self-selected video, or playing a video game. An example of learning screen time is a child using an app/program designed for learning, such as programs used at school. When it comes to children and screen time, entertainment screen time dominates the percentage of time children spend in front of the screen. The CDC has reported that children 8 to 10 years of age spend approximately 6 hours per day viewing screens for entertainment.

In 2010, the Kaiser Family Foundation released one of the largest studies on the amount of media use among American youth. They reported that kids aged 8 to 18 now spend 7.5 hours in front of a screen for entertainment each day. That's just the time kids spend in front of a screen for entertainment. It doesn't include the time they spend on the computer at school for educational purposes or at home for homework.

In 2016, the American Academy of Pediatrics issued updated screen time recommendations. The Academy no longer provides a specific recommendation for "maximum number of hours" for children ages 6 and older. For years, the Academy recommended no more than two hours of daily screen time for children aged 6 to 17. The two hour maximum has now been removed to reflect the realities of today's digital world.

Recent interview data from families served in California revealed consistent results, reflecting a range of 4 to 6 hours per day of entertainment screen time for the average child, aged 5 to 14, without special needs. The special needs population reported higher screen time usage of 8 to 10 hours per day.

With screen time increasing, one would think that children's reading abilities would also be increasing. This is not the case. Just over 1 in 3 American kids reads proficiently in grades 4 or 8, according to the 2019 National Assessment of Educational Progress. Reading scores in both grades have declined significantly across states, races, and income levels, in both public and private schools. Experts wonder if the ever-increasing amount of time kids spend in front of screens could be the reason for the decline in reading abilities.

Finally, in 2019, a group of JAMA Pediatrics scholars conducted a meta-analysis of 58 cross-sectional studies, to address the following question: What is the association between screen-based activities and academic performance areas among children and adolescents? Here's what the study found: as kids' television viewing and video game playing increased, academic performance decreased, in both children and adolescents. Academic performance, however, did not decrease when overall screen media increased. In other words, academic performance suffered only when kids were using the screens for entertainment purposes (as compared to using the screen for academic endeavors).

This brings us to an important conclusion: our kids are spending an enormous amount of time on screens, without receiving any educational benefit for doing so. Large quantities of entertainment screen time may be causing impaired academic development in children. This problem could have a devastating impact on our future. Novel solutions are needed.

SUMMARY OF THE INVENTION

Albert Einstein taught us that "We Cannot Solve Our Problems With the Same Thinking We Used When We Created Them". While engaging for children, with gamification and serious games, you still have to sit down and intentionally play the learning game. This is problematic, because most children prefer to be exclusively entertained (no learning), than to intentionally play a learning game. This problem is innovatively solved with the present invention, which does not require children to sit down and intentionally play a learning game. Instead, in the present invention they are naturally engaged with an activity of choice (watching a video, for example) when the system automatically blends learning into the entertainment screen. The necessity of intentionally playing a learning game has been removed, thus eliminating a major barrier that prevents learning for many children. With this barrier removed, learning may now occur on an entertainment screen where previously no learning would occur, which is critically useful for the restoration of learning in today's modern society. Now, the child watching a video in the grocery store will no longer be spending those hours with nothing to show for it. (S)he will also be unobtrusively learning at the same time.

The present invention can be viewed as having four major components:

(1) The invention Automatically Converts children's entertainment screen time into learning screen time (a novel way of creating learning where otherwise there is no learning). This component is referred to as Auto-Conversion of Entertainment Screen Time into Learning Time. Now, the learner does not have to intentionally sit down and play the learning game. Instead, (s)he is naturally engaged with an activity of choice (watching a video) when the system begins automatically begins blending learning into the entertainment screen.

(2) Additionally, the invention employs a novel Continuous Engagement Method During Learning, to keep the learner engaged in academic functioning (where engagement would otherwise be continuously declining without use of the present invention). The invention automatically maintains the learner's state of focused attention while also providing instruction.

(3) The invention utilizes an Artificial Intelligence (AI) architecture to customize the type of instruction the learner receives and to customize delivery of the instruction itself by closely monitoring the learner's academic progress, emotional mood state, and attentional focus (a novel way of creating a highly customized learning experience, where the learning experience would otherwise have been only standardized and less engaging). This method is referred to as Artificial Intelligence Methodology During Technology Based Learning to Customize Delivery of Academics and Improve Mood State and Attention.

(4) The invention solves a critical problem for special learners (e.g., those having ADHD, autism, dyslexia, memory impairment). These specialized learners have a very difficult time benefiting from traditional reading instruction. The invention effectively creates hundreds of learning opportunities per day for the special learner, who cannot access traditional reading instruction. Severe special learners are literally not able to sit in a chair and cognitively attend to a traditional teacher. A highly innovative approach is required to unobtrusively insert learning content into the entertainment screen while this special learner is already at a maximized state of attention. This component is referred to as Novel Instruction for Special Learners that is Engaging.

Innovative learning solutions are especially important in the midst of the COVID-19 pandemic, where more children are learning from home. In today's changed reality, many families have learned for the first time that it is possible to conduct highly effective schooling at home, but creative learning solutions are needed to accomplish this. There is great need for highly innovative solutions that allow learning to continue uninterrupted, even in the midst of school shutdowns.

For ease-of-reading, "the present invention" or "the innovative computer system" is often referred to herein as "the system".

BRIEF DESCRIPTION OF THE DRAWINGS

These and other more detailed and specific objects and features of the present invention are more fully disclosed in the following specification, reference being had to the accompanying drawings, in which:

FIG. 4 (B) illustrates Unobtrusive Interweaving of entertainment with learning.

FIG. 5 illustrates the Elapsed Time Method within the present invention.

FIG. 8 (B) illustrates the relationship between Exercise and Learning in the present invention.

FIG. 13 illustrates the Continuation of Automatic Transitioning and the Continuous Engagement Method.

FIG. 16 is a Side by Side Comparison of the traditional Declining Engagement Method (Prior Art), and the Continuous Engagement Method within the present invention.

FIG. 19 (B) is a high level view of the Artificial Intelligence (AI) Architecture within the monitoring of emotional mood state and sustained attention portions of the present invention.

FIG. 24 is a description of the most relevant demographics for use of the present invention.

DETAILED DESCRIPTION OF PREFERRED EMBODIMENTS

Problem to be Solved

How do we strike a healthy balance between the entertainment screen time that kids want, and the academic screen time that will fuel academic growth and a productive future society? Solving that problem is a primary purpose of the present invention. Another primary purpose is to help struggling learners, and frustrated parents.

With this invention, there is now a way to convert children's entertainment screen time into learning screen time (and create learning upon a screen where there would otherwise have been no learning).

How the Computer Invention Teaches

In today's modern society, an embodiment of the present invention uses Streaming Video Integration, which occurs via a hardware and software platform. There are also other useful embodiments. We will first discuss this embodiment. In Streaming Video Integration, the learning content (teaching words, for example) is integrated directly into streaming videos. Video content is hosted on a computer server, and users have a portal that allows them to access the video content with a video player, with one major differentiating factor within the user interface design: while the learner is viewing a video, they are transitioned by the present invention automatically to a new screen, that presents a single teaching point, to begin the computer assisted learning process.

Figure 1:
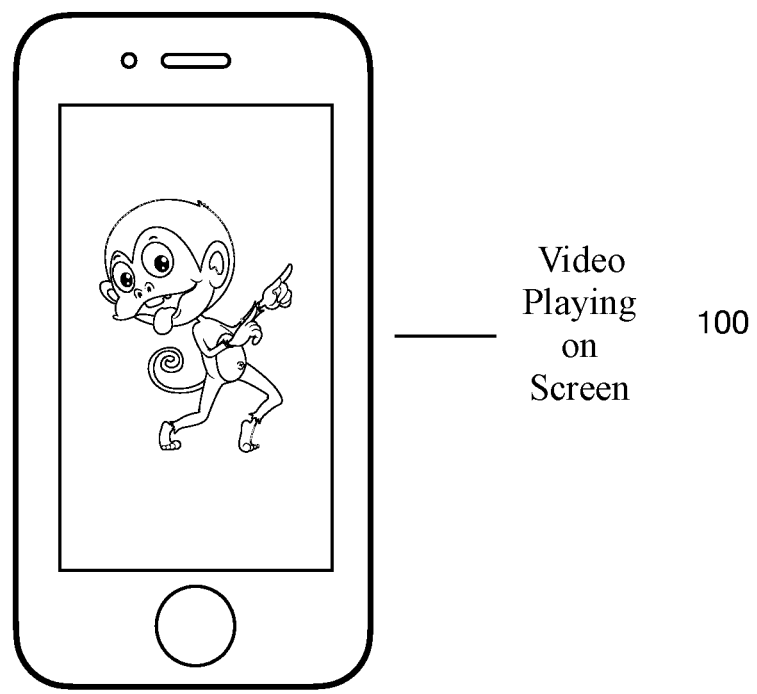
FIG. 1 illustrates a child engaged in entertainment screen time (Prior Art).

FIG. 1 illustrates a learner engaged with video entertainment screen time (watching a video of choice), using the video player. In this patent application, "learner" is used synonymously with "child", but it must be understood that the learner may also be an adult. For ease-of-reading, the word "learner" is used herein to apply to all learners regardless of age.

Figure 2:
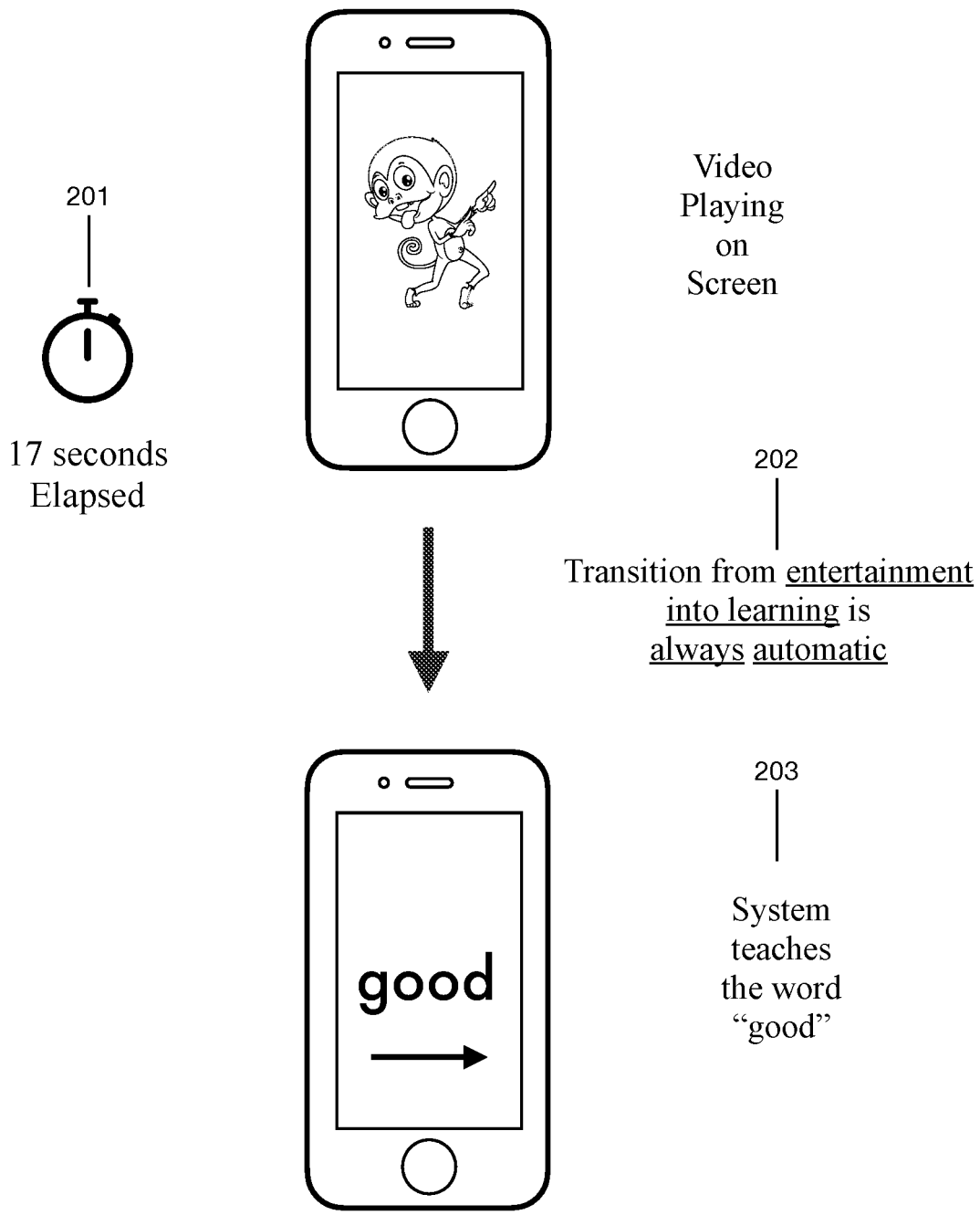
FIG. 2 illustrates the present invention's process of automatic transitioning from entertainment into the learning task.

In FIG. 1, the learner is watching a preferred video of choice, for entertainment (100). During viewing time, the present invention continuously monitors the duration of the user's video viewing time. When the user begins watching a video, the system's internal timer (which is not visible to the user) begins monitoring duration. After the user has been watching the video for, e.g., 17 seconds (FIG. 2, item 201, default setting), the Elapsed Time Method (discussed momentarily) transitions the user into learning, automatically (no user input needed), FIG. 2, item 202. In FIG. 2, the user automatically arrives at the teaching screen, and the system teaches one piece of instructional content. In step 203, the system teaches the child the word "good". The piece of content may be a single word, series of words, a definition, a word problem, a math problem, or any appropriate piece of content, that can be studied in ideally less than 10 seconds. In this example, the word "good" transitions onto the screen using a visually stimulating transition, such as animated text, or any other appropriate visual effect that prioritizes the user's visual engagement. The word never simply appears (without visual effects), due to the fact that the present invention was designed to transition the word using a method that mimics what learners are accustomed to seeing during modern video watching experiences (attractive, visually stimulating, movement-oriented text transitions). Sound effects can be utilized to add auditory engagement. A useful design comparison is the extraordinary attention to detail that film producers give to every second of production time, in order to create a visual result that maximizes user engagement. The present invention dedicates the same level of care and analysis to creating a maximally engaging visual result, which allows for the most efficacious learning possible. In this FIG. 2 example, after the word has arrived on the screen, an audio recording of the word speaks the word to the learner, while an animated line simultaneously underlines the word, using a wipe transition from left to right. Simultaneous with these effects, the word flashes once, at the same time the audio recording speaks the word. The purpose of the flash is to visually stimulate the learner's visual field, simultaneous with hearing the word, to create a visual-memorial association that the word heard is associated with the word that just flashed. The purpose of the animated line underlining the word is to create a visual-memorial association that words are read from left to right in English. The animated line swipes from right to left in other languages such as Arabic, Hebrew, and Farsi. The quality of the audio recording consists of a live human voice-over professional recording embodied in an audio sound file, using a studio quality microphone, with positive energy tonality in the speaker's live human voice. One shortcoming with techniques from the past (prior art) was the use of less than ideal audio recordings. A child's nervous system is incredibly sensitive to small differences in vocal intonations. A child is more responsive during learning events to live human articulations, where the words are intentionally spoken with positive energy tonality in the speaker's voice. Vocal recordings also occur at a higher frequency, in the range of 175 to 320 Hertz (Hz), which contributes to child responsiveness during learning. Transitions occur very rapidly for empirical reasons that will be discussed next.

Rapidity & Automaticity

Figure 3:
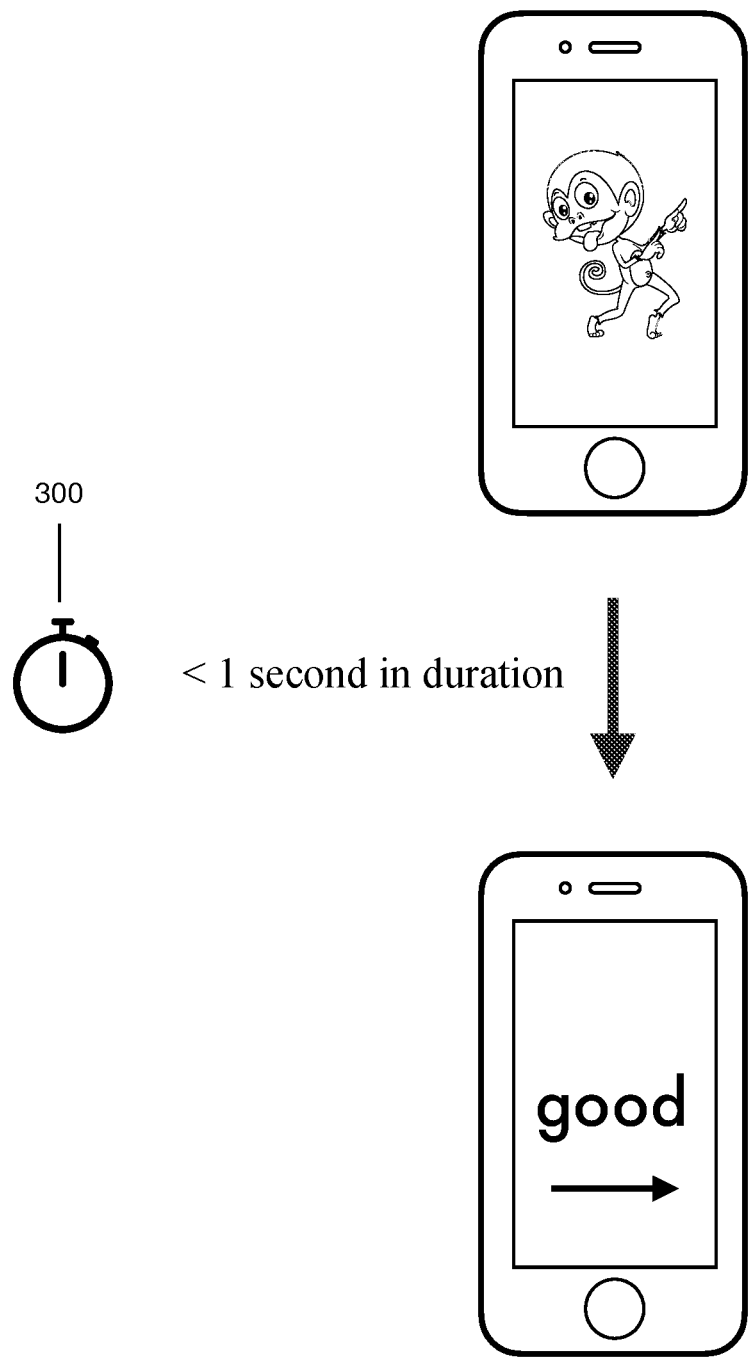
FIG. 3 illustrates the Transition Automaticity and Rapidity features of the present invention.

The speed at which transitions occur is an important facet of the present invention. In FIG. 3, item 300, the transition from entertainment to learning is automatic and extremely rapid (generally less than 1 second in duration, depending upon capabilities of the computer platform that hosts the invention).

Transition Rapidity is important for the following empirical reasons. While watching entertainment, the learner's attention is maximized. When we insert the learning, we are interrupting the state of maximized attention. When we interrupt a state of maximized attention, we need to work quickly; otherwise, we may lose the child's attention. Therefore, the system transitions back-and-forth between screens very quickly. Quick transitions equate to two positive outcomes: (1) maximizing time exposure to the learning content, and (2) easier maintenance of the child's attention when transitions are rapid.

In addition to Transition Rapidity, Teaching Rapidity is equally important. We have interrupted a state of maximized attention. When this is the case, teachings must be brief; otherwise, we run the risk of losing the behavioral momentum that was built during the entertainment video watching. We then risk losing the attentional storehouse that we have built with the learner, and may have to start from scratch if attention is lost. Brief teachings, with a rapid return to the entertainment video, solve this problem. To accomplish this, when the system is teaching simple, single words, the entire single-item teaching process usually occurs in less than 3 seconds (FIG. 4 (A), item 400).

Transition Automaticity (no button presses needed) is also important (FIG. 2, item 201), for the following reason. Without automatic transitions, most children would simply choose to keep watching entertainment. Transition Automaticity alleviates this problem. The child is enjoyably watching their video, and presto, now they're automatically learning for a few seconds. The innovation allows learning to read to now become pleasant, and unobtrusively interwoven into a child's regular daily routine.

Different Transitions for Different Types of Screen Time

Figure 4:
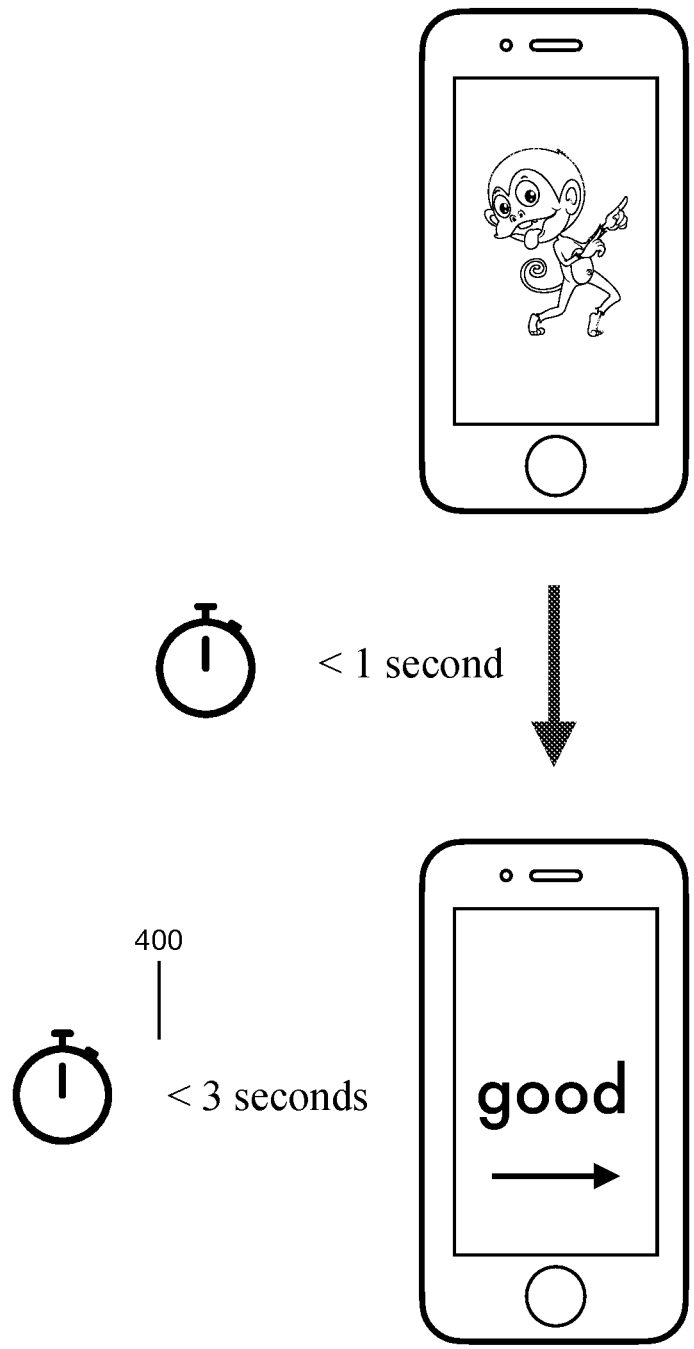
FIG. 4 (A) illustrates the conceptualization of Brief Teachings that Allow for the Continuation of Sustained Attention of the present invention.

Unobtrusively interweaving learning into the normal daily routine is a critical element of the present invention, for the following reason. Learning techniques from the past, while well-designed, did not consider the important need for unobtrusive interweaving into the daily routine. Subsequently, a well-designed learning program is not utilized consistently by the child, which does not achieve ideal learning efficacy. The present invention was specially designed with great care for unobtrusive interweaving into the daily routine. For this reason, the invention is utilized consistently by the child, which creates maximized learning efficacy. FIG. 4 (B) illustrates the critical difference between entertainment screen time from the past (301), as compared to the present invention (302). In 303, typical entertainment screen time consists of presenting nothing but entertainment, which produces zero learning events (304). With the present invention (302), three learning events per minute are unobtrusively interwoven into the entertainment screen (305). This creates 90 learning events in 30 minutes of instruction, 306. It is important to explain that these are learning events the child actually participates with, without complaint. The best learning system in the world has limited efficacy if the child won't actually use it. Unobtrusive interweaving is an innovative format that learners participate with avidly, with learning events automatically embedded into the learner's normal daily routine, making access to learning effortless.

The present invention blends learning into each of these types of Entertainment Screen Time, using a specific methodology for each. We will first discuss integration into the embodiment (1) Video Entertainment Screen Time, for which two different methods are utilized: a) The Elapsed Time Method, and b) The Between Clips Method.

Figure 6:
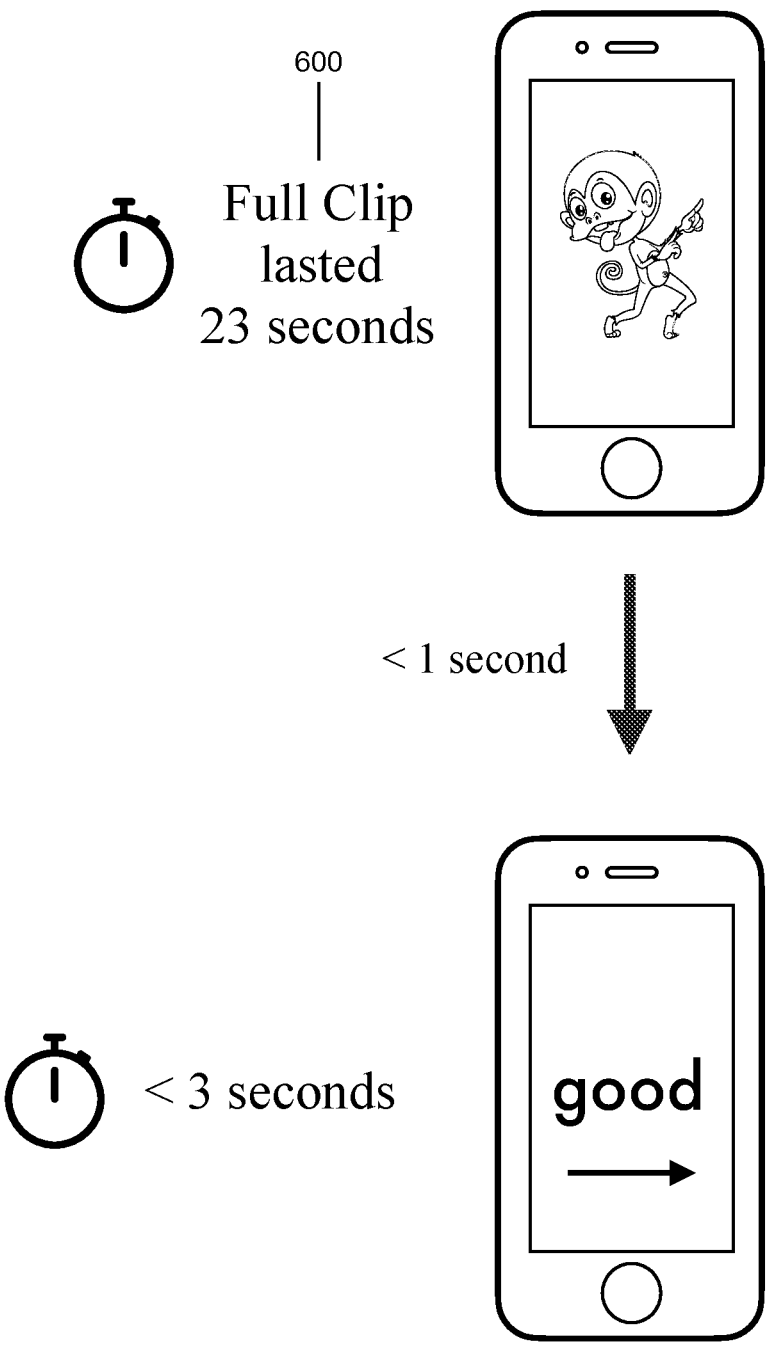
FIG. 6 illustrates the Between Clips Method within the present invention.

In FIG. 5, the Elapsed Time Method presents a teaching point after a specific amount of elapsed time (500). In this example, the system presents the teaching point after 17 seconds of entertainment time (typical default setting). During the Between Clips Method (FIG. 6), the system presents a teaching point at the end of a video clip (600), and before the next video clip begins. In this example, the system presents the teaching point after the initial 23-second video clip ran to completion. Each method has advantages and disadvantages for the individual learner. Therefore, the system makes adjustments based upon what works best for the individual (see the Artificial Intelligence embodiment discussed below).

Figure 7:
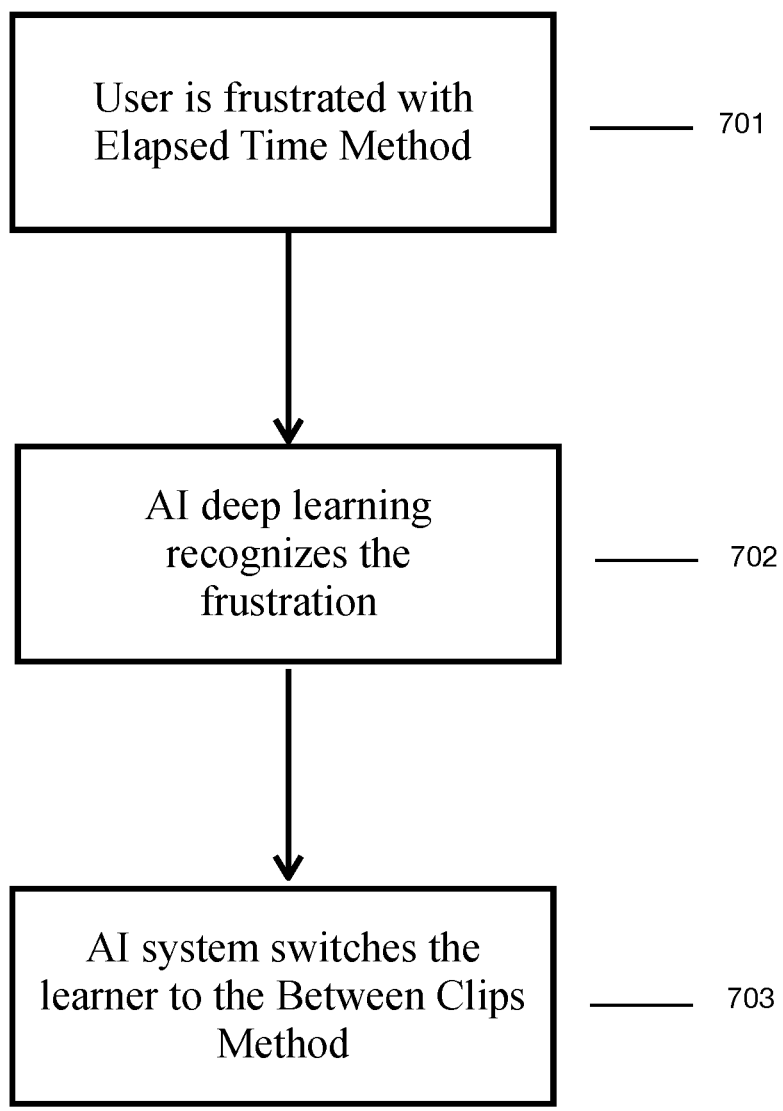
FIG. 7 illustrates the process of AI understanding the user within the present invention.

The main benefit of the Elapsed Time Method (FIG. 5) is that teaching is very structured (we know precisely how many teaching points are being delivered per minute). In addition, more teaching points can be delivered overall with the Elapsed Time Method, which increases the rate of learning for some learners. The main disadvantage is that learning integrates during video play, which is frustrating to a small percentage of the population. The vast majority of the population is undisturbed by this, due to the fact that the video is paused during teaching time (and due to the fact that teaching segments are so short; only around three seconds each). For the small percentage of children who find midvideo teaching frustrating, the AI system learns this using computer vision and audio processing, and the system automatically switches the learner to the Between Clips Method (FIG. 7). In 701, the user is frustrated with the Elapsed Time Method, and the system recognizes this, 702. The AI system then switches the learner to the Between Clips Method, 703.

Two main benefits exist with the Between Clips Method: a) easily frustrated users receive teachings only when a video has concluded, and more importantly b) the system inserts learning at the precise moment that the brain has released neurochemicals that are advantageous for learning. Some explanation is helpful here.

Neurochemicals and Learning

Figure 8:
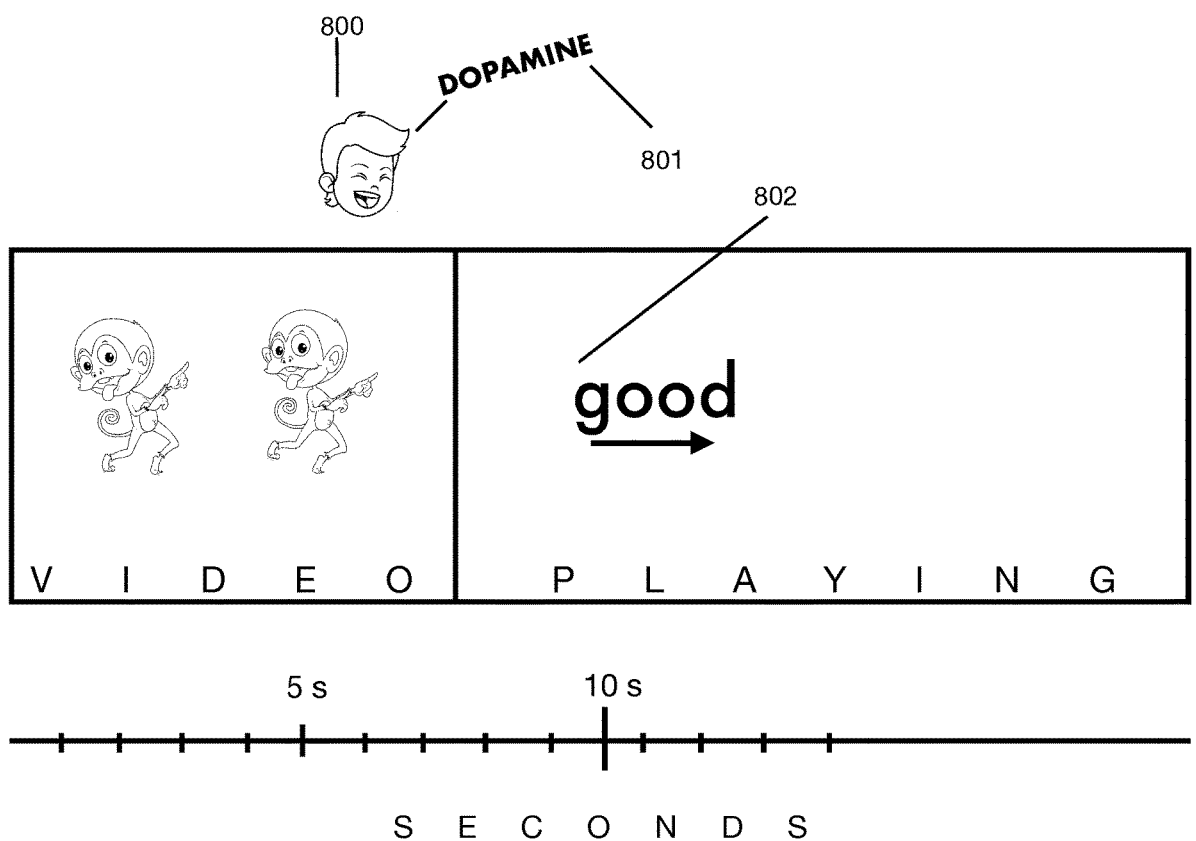
FIG. 8 (A) illustrates the importance of Neurochemicals and Learning within the present invention.

Many video clips provoke user laughter at the end of the video (also known as delivering the "punchline"). When we laugh, our brain releases dopamine (amongst other chemicals that are beneficial for learning, such as endorphins). Dopamine can enhance learning, and attention. Picture a child watching a short video clip (FIG. 8). At the end of the clip, (s)he laughs (800). That laughter creates a small release of beneficial chemicals in the child's brain (801). And the present inventive computer system now inserts learning, immediately after the release of those chemicals (802). The end result is ideal timing; the teaching point is delivered immediately after the release of neurochemicals beneficial for learning, and the child's positive mood state is at a peak, immediately prior to the learning event. The positive result of this approach has been observed extensively in the field: when a child has just finished laughing, the insertion of a teaching point does not bother the child in the slightest. An additional observation in the field led to testing another method for increasing learning efficacy, which we will discuss next.

Exercise and Learning

Field observation and testing revealed consistent findings in the domain of learning during physical exercise. Learners are consistently more willing to participate with learning activities when they are permitted to exercise while learning. Some learners also experience increased learning efficacy when conducting learning activities during exercise. When we exercise, endorphins are released by our brain. These neurotransmitters interact with the receptors in our brain, to reduce our perception of pain (learning to read is painful for struggling learners) and to promote pleasure. It is common for older learners to utilize the present invention during exercise, such as while using a treadmill. In an embodiment, the present invention acquires data from the learning device's accelerometer (FIG. 8 (B), 803), to ascertain if the learner was exercising during learning. In this example, the learner has been using the present invention for 16 hours, which has created training data: 2,880 learning events have occurred (804). During each of these learning events, the system identified which learning events occurred during exercise, from accelerometer data, and each learning event is assigned an interval number. The interval number is created by the system using one of the following algorithms. There are 86,400 seconds in one calendar day. A learning interval that started at 12:00:00 am is designated as Interval 1. A learning interval that started at 12:00:01 am is designated Interval 2. A learning interval that started at 11:59:59 pm is designated Interval 86400. Academic Raw Data (805) is also coded with the same algorithm, and correct answers are assigned interval numbers (806). The two data sets are then assimilated (807), and the system knows which correct answers occurred during exercise. The system then analyzes the frequency of correct answers, with and without exercise (808). In 809, Juan answered 84% correct during exercise, and 81% without exercise. A 3% increase during exercise was not significant (810). When this is the case, Juan's caregiver is informed of the findings, but it is not empirically necessary to motivationally encourage Juan to exercise during learning (811). In 812, Sofia answered 86% correct during exercise, and 71% without exercise. A 15% increase during exercise was significant (813). When this is the case, Sofia's caregiver is informed of the findings, reminders are sent to the caregiver to encourage exercise during learning, and motivational exercise prompts are delivered to the learner (814). The system detects when the learner is not exercising, and provides these motivational audio prompts, for example: "If you can exercise right now, go for it; learning while exercising is healthy for body and mind".

Another embodiment entails integrating learning into Video Game Screen Time. One method utilized for integrating learning into the video game screen is The Natural Stopping Point Method. Inserting learning into video games is quite different than inserting learning into videos. Many video games are competitive, highly active, and highly stimulating. Inserting learning into the middle of video game play is not an option with some games, even when pausing the game. The result is high user frustration, and a different timing strategy is required during the use of highly active video games. Field testing revealed that the ideal time to insert learning into highly active video games is at a natural stopping point in game play. Some video games have different rounds, stages, and levels, where the user plays for several minutes and then "clears the level", creating a natural stopping point in game play. Field testing revealed that one of these natural stopping points is the best time to integrate learning. The user has "cleared the level" he was playing, which creates a feeling of satisfaction (mood state improved). Users are largely compliant with completing learning tasks during a natural stopping point, and the user is then rewarded with the continuation of game play. Sandbox video games, such as Minecraft, do not naturally contain the clearing of levels and stages. When this is the case, the system creates a stopping point with a customized strategy for game types that do not contain their own natural stopping points. In collaboration with the Elapsed Time Method, the system begins to gradually fade the screen at the amount of elapsed time selected, using a five-second fade, from video game entertainment screen to the learning screen. This lengthy five-second fade provides the user with ample time to comfortably adjust to the transition, which effectively mitigated frustration during field testing. This method is known as The Created Stopping Point Method. During video game screen time, the amount of entertainment screen time utilized is longer (when compared to teaching during the viewing of videos). Field testing revealed user frustration when the video game entertainment screen was interrupted at a short interval, such as 17 seconds. Field testing identified an entertainment interval of three and one-half minutes (3:30) to be an appropriate amount of entertainment balanced with learning, for the average learner. The Natural and Created Stopping Point Methods allow for learning to be integrated into video games in a way that is acceptable to the user, which effectively turns video game time into learning time.

Another embodiment entails integrating learning into General Entertainment Screen Time, during which learning is integrated into other activities on the screen that learners perform for leisure. Children perform a variety of different activities using technology, simply for the fun of it. The child may be drawing with an illustrator program, for example, or (s)he may be looking up content using a web browser (surfing the web). These screen activities do not involve video watching, nor gaming, and are classified as General Entertainment Screen Time activities. In this embodiment of the present invention, inserting learning usually occurs with The Elapsed Time Method (described previously). This method is implemented during General Entertainment Screen Time in the same way as during Video Game Screen Time. For example, a child has been enjoying General Entertainment Screen Time for 17 seconds, and the system then transitions the child to an individual teaching point (FIG. 5).

Figure 10:
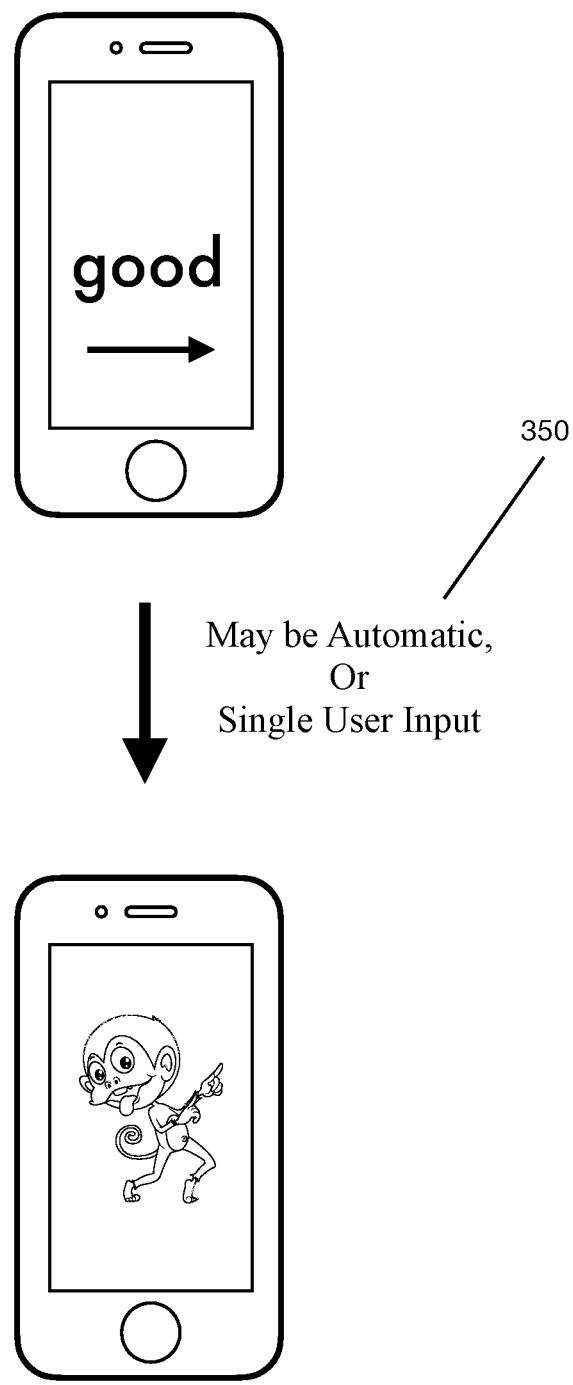
FIG. 10 illustrates how the present invention transitions the learner back to entertainment.

In FIG. 10, a single teaching point has occurred, and the learner now returns to the entertainment video, in one of three different ways (350):

Immediate (automatic) transition back to the entertainment video

Single user input

Quick assessment with single user input

Immediate (Automatic) Transition Back to the Entertainment Video

With this system option, when the teaching screen has run to completion, the user is automatically returned to the entertainment video (no user input required whatsoever).

This version of returning the child to entertainment is useful for subjects with a short-attention span, autism, or other specialized needs. The other two options, described below, are preferred for other users who have sufficient cognitive abilities to participate with a more interactive experience.

Single User Input

Figure 11:
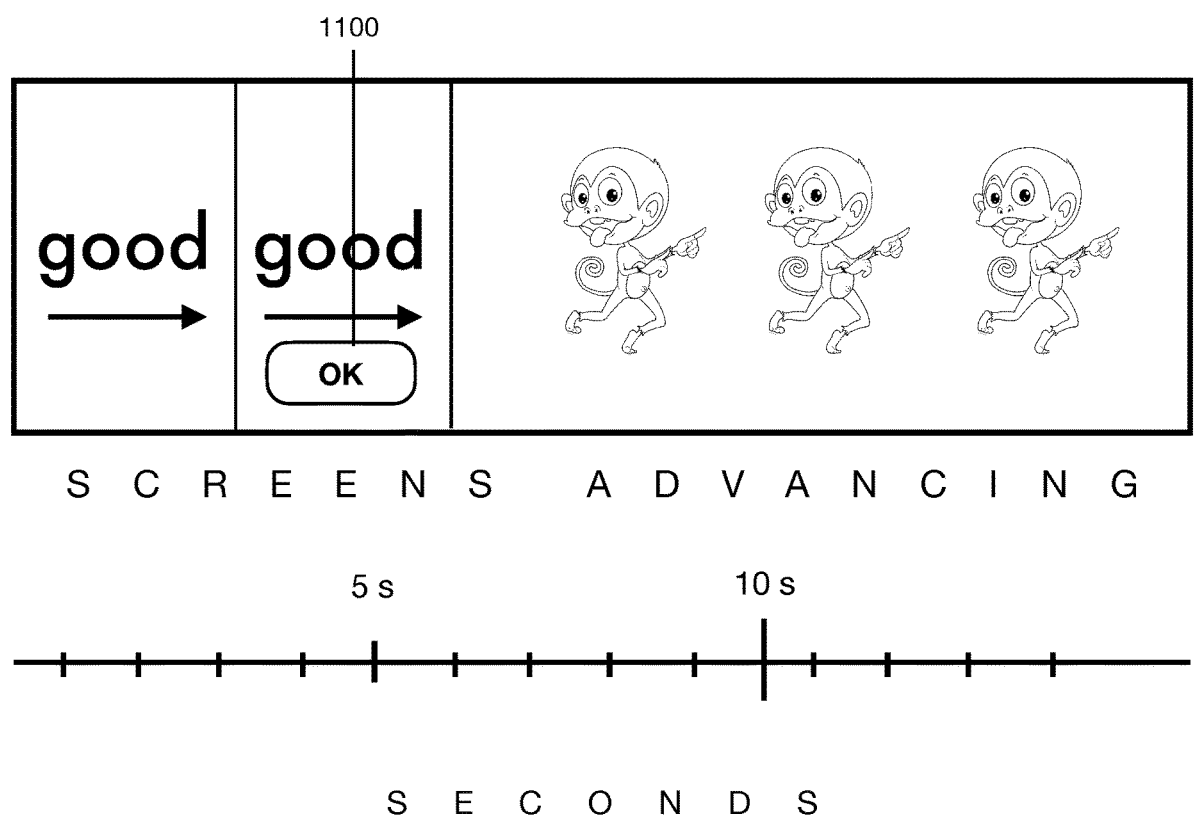
FIG. 11 illustrates the Single User Input transition back to entertainment.

With this system option (FIG. 11), when the teaching screen has run to completion, a button appears on the screen (labeled "OK"), immediately below the word being taught (1100). A single push of the button returns the user immediately to the entertainment video, which autoplays from the point the user was taken off the entertainment screen. This system option is useful for normally developing children, age four and under. These users have the cognitive ability to accomplish a single button push, but may not have the maturity to participate with an assessment.

Quick Assessment With Single User Input

Figure 12:
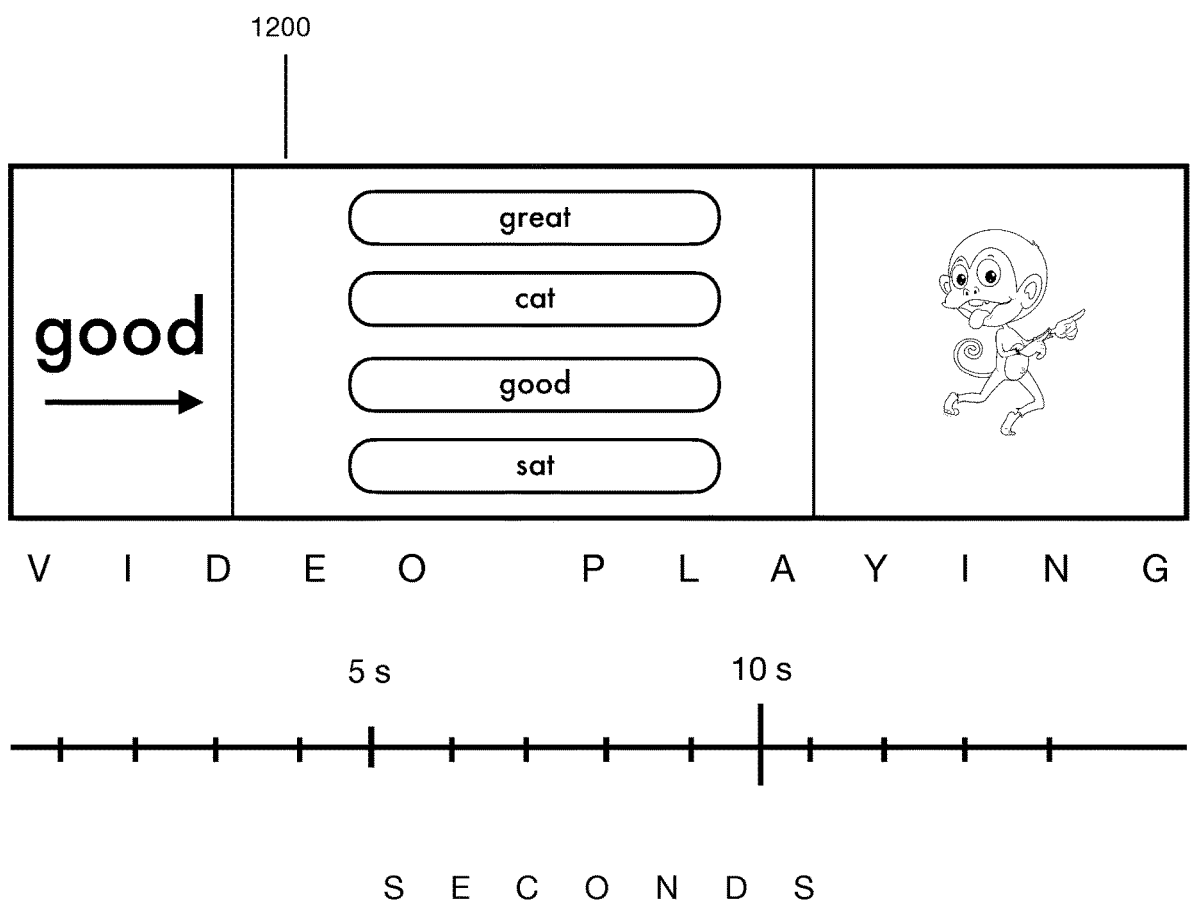
FIG. 12 illustrates the Quick Assessment transition back to entertainment.

With this system option (FIG. 12), when the teaching screen has run to completion, the user is automatically transitioned to a multiple choice assessment, that contains four choices (1200) in the illustrated embodiment. The user is prompted with the audio recording of the word, and (s)he attempts to select the word just learned. If the user's choice is correct, the word flashes once, a chime sounds, and the user is automatically transitioned back to the entertainment video, which autoplays from the point where the user was diverted from the entertainment screen. If the user's choice is incorrect, no stimulation occurs and the user is automatically transitioned back to the entertainment video, which autoplays from the point the user left off. This system option is useful for normally developing children, age five and higher, who have the maturity to participate with an assessment. The word flashing after the correct answer connects to the system's motivational component, for this older demographic, with developing intrinsic motivation to earn rewards (which will be discussed in the Advanced Features portion of this application). The user has now been transitioned back to entertainment; the child is watching the entertainment video of choice again, and subsequent teaching points commence.

FIG. 13 illustrates the continuation of Automatic Transitioning and the Continuous Engagement Method. The system continues to alternate back and forth, between entertainment and teaching, until the learner has received the selected amount of instruction, and/or mastered criteria within the content area as monitored by Artificial Intelligence.

Continuous Engagement Component

There is a specific reason why the computer transitions the learner back to entertainment rapidly: to create continuousengagementwiththelearningtasks. Some background and explanation will be helpful here.

One problem with learning techniques from the past is that the child must intentionally sit down and play the learning game, which relies upon the Declining Engagement Method of the prior art, which has a number of limitations. The Declining Engagement Method is illustrated in FIG. 14.

Figure 14:
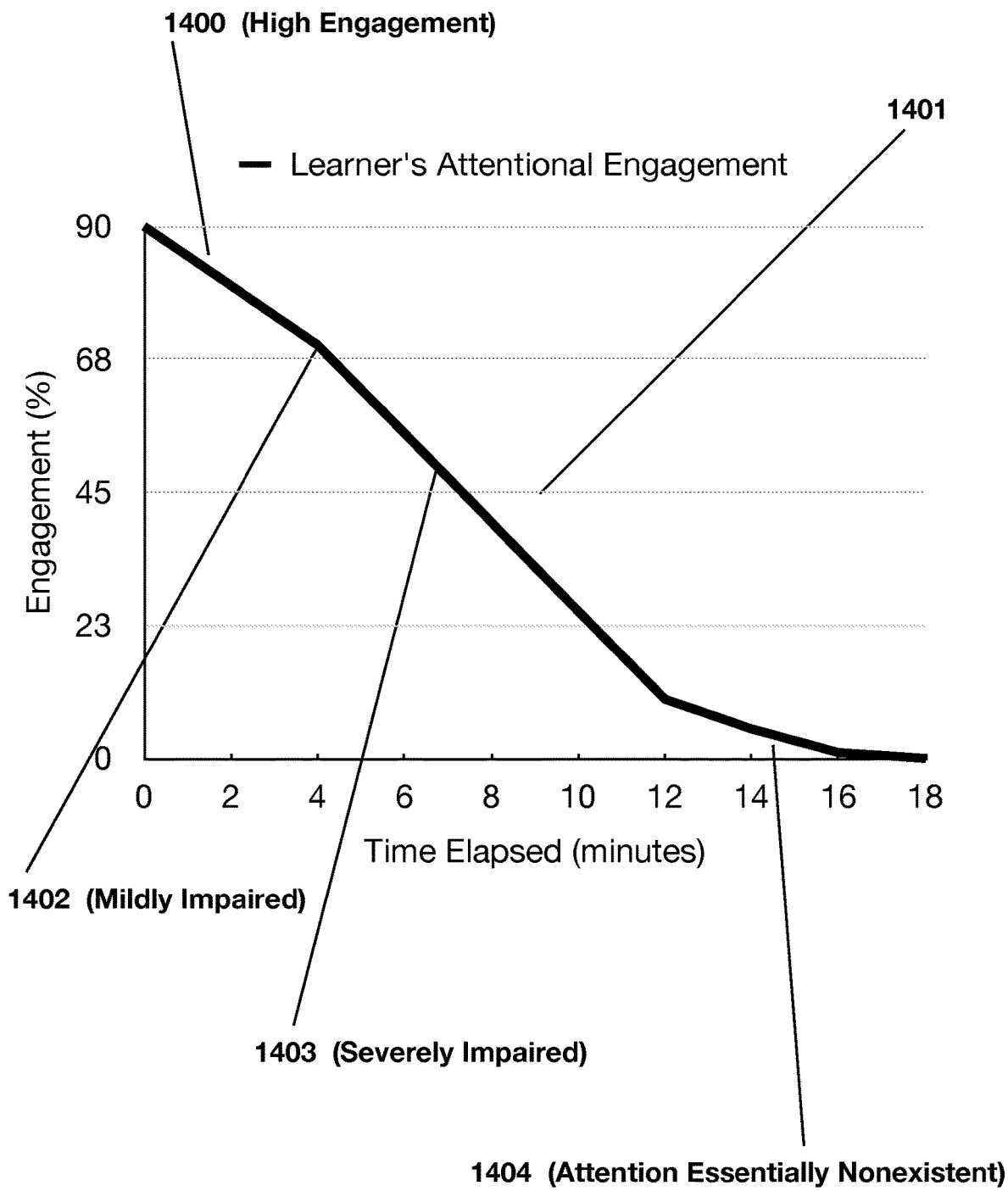
FIG. 14 is a graphical presentation of the traditional Declining Engagement Method (Prior Art).

In the FIG. 14 data set, a 7-year-old child started his reading task at high engagement (1400), but his ability to stay engaged declined consistently (1401). In this example, engagement and attention are "mildlyimpaired" at a percentage lower than 70, so this child's engagement is mildly impaired after reaching just 4 minutes of task duration (1402). Engagement and attention are "severelyimpaired" at a percentage lower than 50, which occurred for this child after reaching approximately 7 minutes of task duration (1403). The child's engagement and attention are essentially nonexistent after 18 minutes of task duration (1404). This problem, created by the declining engagement method, is greatly alleviated with the present invention, which utilizes a different engagement methodology: Continuously Maintained Engagement.

Figure 15:
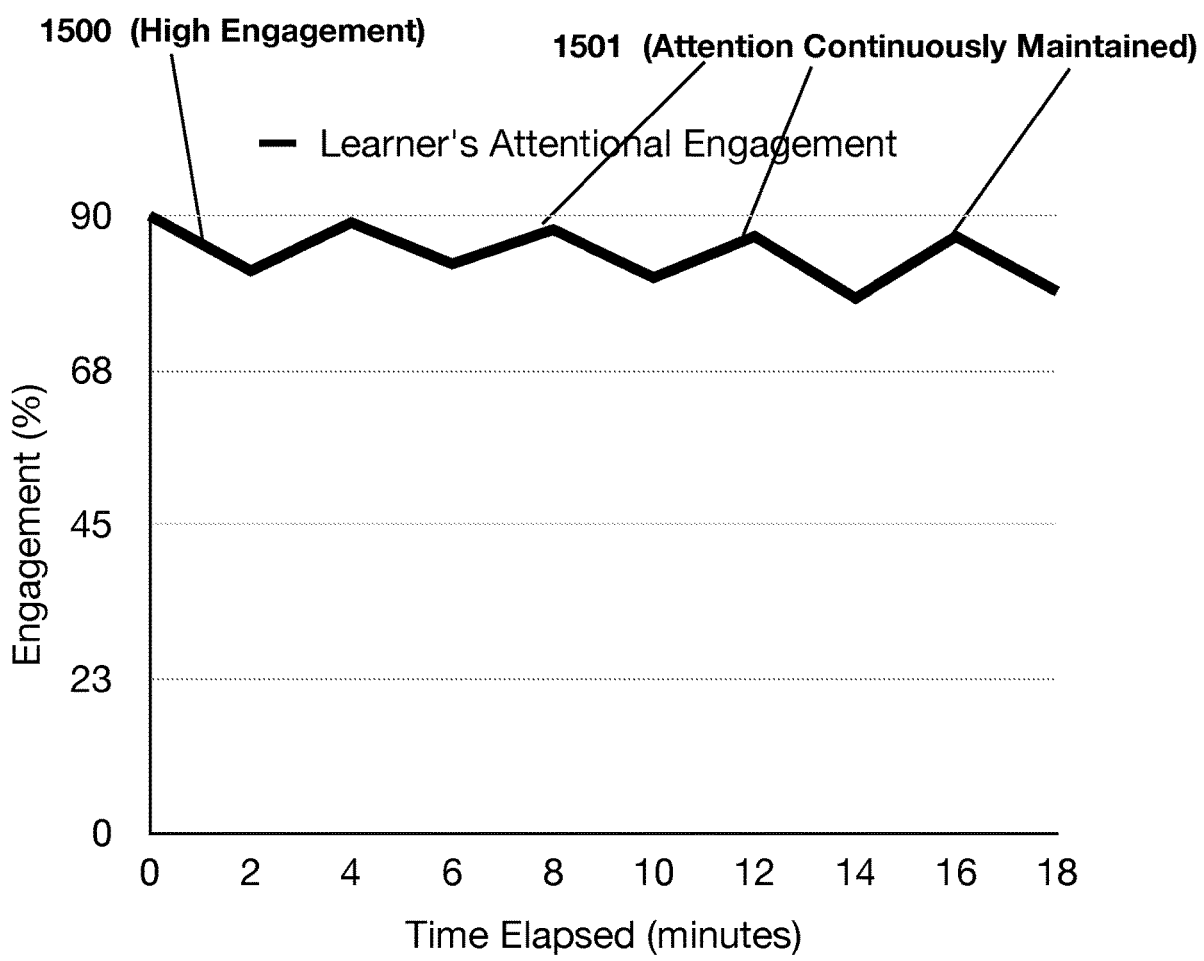
FIG. 15 is a graphical presentation of the Continuous Engagement Method within the present invention.

The Continuous Engagement Method is illustrated in FIG. 15. In this data set, the same 7-year-old child started his reading task at high engagement, just like before (1500). However, his engagement is continuously maintained using the Continuous Engagement Method of the present invention. The Continuous Engagement Method is executed by the system using the following primary components:

(1) The transition from entertainment to learning is automatic and extremely rapid.

(2) Teachings are brief, with a rapid return to the entertainment video.

(3) The transition from learning back to entertainment is also rapid.

(4) Teachings are conducted in a highly engaging fashion.

(5) AI customizations are made continuously to improve instructional conditions for the individual.

(6) A motivational component exists, to enhance attentional abilities.

In FIG. 15, with over 18 minutes of task duration, the child's engagement and attention neverdroppedbelowthecriterionpercentageof70 (the threshold for an acceptable level of sustained attention) (1501). This continuous maintenance of attention is accomplished by utilizing the six components above (Continuous Engagement Method).

Certain children require continuous maintenance of attention during learning tasks. These children must learn in tiny pieces, and while attentionalfocusisatitshighest. And that's exactly how the present invention presents the learning. What type of children must learn this way? Specifically, two different types: (1) children with limited maturity (age 6 and below), and (2) children with attentional and other impairments (e.g., ADHD, autism, dyslexia, memory impairment). These learners must learn in this fashion, but when it comes right down to it, all of us benefit from learning new information in small, manageable pieces. The present invention does not ask the child to "sit and learn for 15 minutes"

like techniques from the past (Declining Engagement Method). Even when the child is playing a learning game that was designed to be engaging, 15 minutes is far too long for certain kids (even 1 minute is too long for the severe end of the spectrum). This unique solution of the present invention requires the child to learn for only a few seconds at a time. Just a few seconds is realistic for this learning style, and the child begins to learn.

FIG. 16 is a side by side comparison of the Declining Engagement Method and the Continuous Engagement Method. In FIG. 16(a), Declining Engagement Method:

The learner's ability to stay focused during the learning interval is lower, which results in less learning success.
The learner needs a break much sooner, which also results in less learning efficiency.

In FIG. 16 (b), Continuous Engagement Method:

The learner's ability to stay focused during the learning interval is higher, which results in more learning success.
The learner does not need a break as soon, which also results in more learning efficiency.

An illustrative example is useful here. Imagine taking a 2-year-old to a restaurant. We know that it will only be a matter of time before the 2-year-old gets bored with the surroundings and starts to get fussy. It's as if we have started a countdown timer on the child's ability to maintain attention/engagement the moment we walked into the restaurant. As we remain in the restaurant, the clock is ticking on the child's ability to remain engaged, and we start to see warning signs (fidgety behavior, facial expressions that classically communicate frustration, a change in body language, verbal and auditory expressions that are associated with frustration). When we begin to notice these warning signs, we make changes to the child's environment. In the restaurant, that change may consist of standing up and walking around with the child, to show the child new and interesting things. Within the present invention, artificial intelligence notices the same warning signs (utilizing computer vision, audio processing, and other instrumentation) and begins making immediate changes. The details of the artificial intelligence (AI) architecture of the present invention are detailed in the forthcoming section.

Artificial Intelligence (AI) Architecture of the Present Invention

For the 2-year-old at the restaurant, it is possible to continuously maintain the child's attention for as long as reasonably feasible by using a well-stocked supply bag filled with interesting things. However, that is much more work intensive for the child's caregiver. During computer learning events, likewise, it is possible for the human to continuously maintain the child's attention in front of the computer for as long as reasonably feasible, but the better option is for technology to do the heavy lifting (instead of a live human being required to exhaustingly tend to the continuous maintenance of attention). And herein lies another aspect of the novelty of the present invention.

Figure 17:
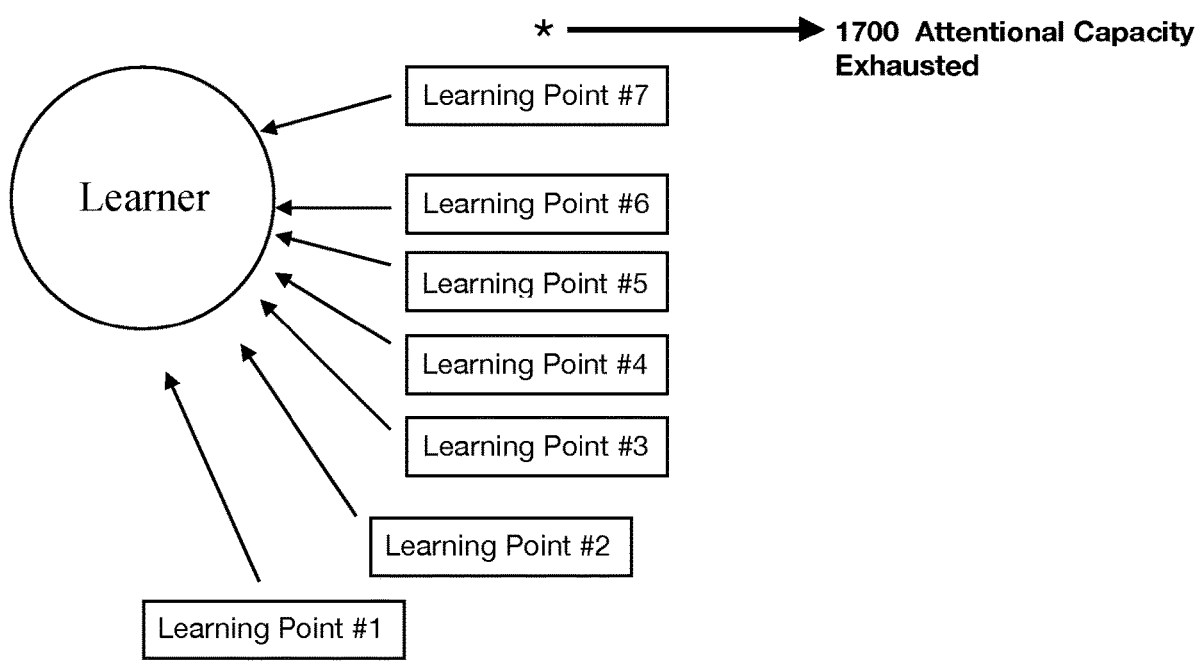
FIG. 17 is an illustration of the Traditional Method of Teaching (Prior Art).

FIG. 17 illustrates how teaching usually works. The traditional method of teaching consists of the teaching of one learning point after another, until the learner's attentional capacity has been exhausted (1700). This method results in:

Learner can no longer continue learning.
Learner may be overwhelmed.
Learner may now be in a negative emotional state.
Refusal to participate is likely.
Less learning is inevitable.

Figure 18:
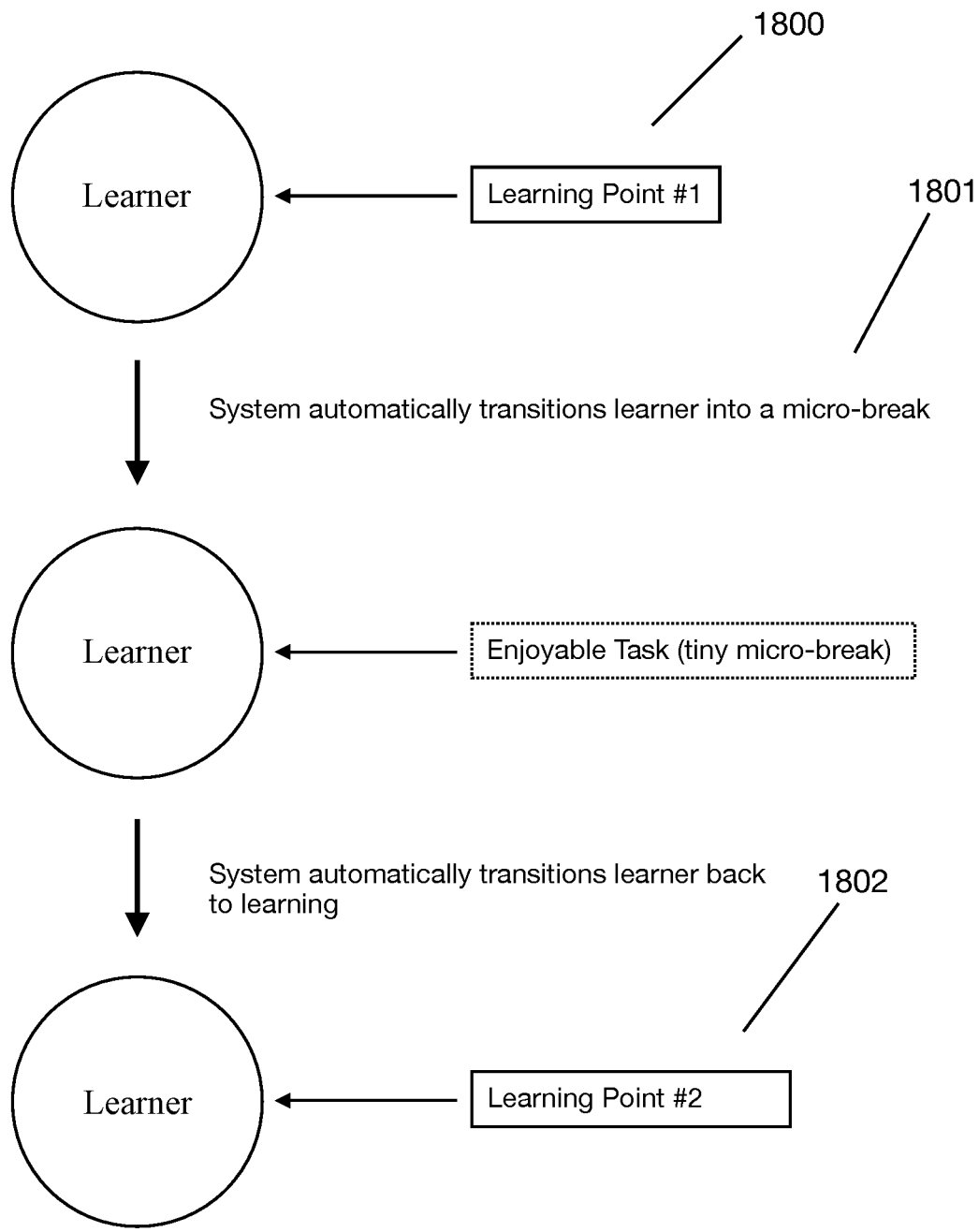
FIG. 18 is an illustration of the Continuous Engagement Method within the present invention.

With the present invention, we don't wait until attentional capacity has been exhausted. The novel approach is illustrated in FIG. 18. The Continuous Engagement Method utilizes a novel format:

One teaching point is presented at a time (1800).
Then, the system automatically transitions the learner back into enjoyable video entertainment, which serves as a tiny micro-break (1801).
The micro-break refreshes the learner's attentional capacity.
Learning continues in a more effective, more efficient manner until the end of an appropriate interval (1802).

The novel method results in:
Learner can continue learning.
Learner remains in a positive emotional state.
Continued participation is likely.
More learning is inevitable.

At this point, we have discussed the first two components of the present invention:

(1) The present invention Automatically Converts children's entertainment screen time into learning screen time (a novel way of imparting learning where otherwise is no learning). This method is referred to as Auto-Conversion of Entertainment Screen Time into Learning Time. Now, the learner does not have to intentionally sit down and engage with learning. (S)he now engages only the entertainment, and the innovation seamlessly blends learning into the entertainment screen.

(2) Additionally, the invention employs a novel Continuous Engagement Method, to keep the learner engaged in academic functioning (where engagement would otherwise be continuously declining without use of the invention). This method is referred to as Continuous Engagement Method During Learning.

This brings us to discuss component (3):

(3) The invention utilizes an Artificial Intelligence (AI) architecture to customize the type of instruction the learner receives and to customize delivery of the instruction itself, by closely monitoring the learner's a) academic progress, b) emotional mood state, and c) level of sustained attention.

AI and data science allow for the system to create a more customized and effective learning process, which is also more enjoyable for the learner. The methodology allows for discovery of specific problem areas and subsequent presentation of customized instruction within the problem areas.

The present invention's deep learning systems are utilized to:

(1) Customize the type of instruction the learner receives, based upon the learner's academic progress.
(2) Customize the delivery of the instruction itself, based upon the learner's emotional mood state.
(3) Customize the type of instruction and delivery, based upon the learner's level of sustained attention.

Figure 19:
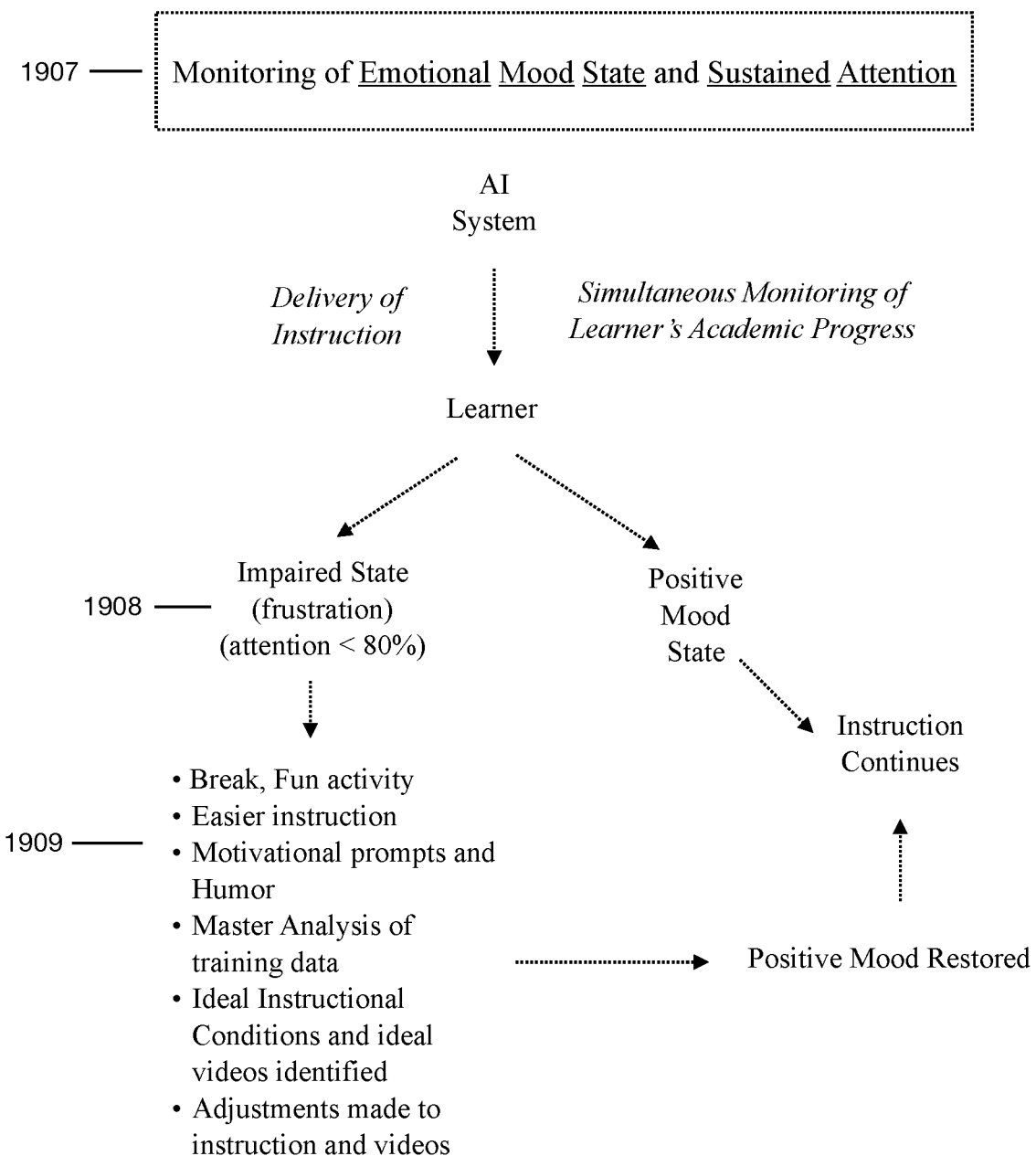
FIG. 19 (A) is a high level view of the Artificial Intelligence (AI) Architecture within the academic progress portion of the present invention.

FIG. 19 (A) illustrates the beginning of the process (a detailed view will be discussed following this high level view). In FIG. 19 (A), item 1901, the system begins teaching the learner. The system simultaneously monitors the learner's academic progress (words learned), 1902. When the learner is not doing well during a typical reading lesson (1903), (s)he may be having difficulty in one or more of the following areas:

| | |
|---|---|
| The Alphabet | Contractions |
| Initial Phonics | Technical Words |
| Complex Phonics | Emotion Words |
| Basic Sight Words | Science Words |
| Complex Multisyllabic Words | Social Studies Words |

| | |
|---|---|
| Homophones | Geography Words |
| Homographs | Compound Words |
| Nouns (people) | Acronyms |
| Nouns (places) | Descriptive Words |
| Adjectives | International Phrases |
| Past Tense Words | Math Words |
| Future Tense Words | Measurement Words |
| Irregular Verbs | Money Words |
| Plural Words | Time & Calendar Words |
| Collective Nouns | Commonly Misspelled Words |

Deep learning systems gather data points within these domains related to the frequency of the learner's wrong answers. The algorithm processes the data to identify key trends, and associates those to problems for the learner within these specific problem areas. When a learner is deficient, for example, in the acquisition of Basic Sight Words, deep learning systems learn this, and begin introducing targeted instruction (1904), in order to begin ameliorating the learner's deficiency in that specific area. The system repeats the instruction, until the content area is mastered (1905). As the learner's proficiency improves, the system then begins working with the child on the next area of priority (1906). Learning categories are prioritized in terms of their level of importance, and the system focuses first on the highest priority domains. The machine learning approach allows the system to learn from historical training data, and continue moving the learner's progress forward, toward the end goal of creating a proficient reader (language learner).

The present invention's deep learning systems are not limited to academic data (FIG. 19(A), item 1900). Deep learning systems also gather a completely different type of data, utilizing computer vision and other instrumentation, which allows for a highly customized delivery of instruction based upon the learner's emotional mood state and amount of sustained attention (FIG. 19(B), item 1907).

AI Customization of the Delivery of the Instruction Itself Based Upon the Learner's Emotional Mood State and Level of Sustained Attention A live human teacher pays close attention to 1) the frequency of the learner's wrong answers, 2) the learner's facial expression, body language, verbal comments containing language, and verbal expressions not containing language that are associated with distress or frustration, and also 3) if the child is paying attention adequately.

When the learner is frequently responding with incorrect answers, the likelihood of frustration increases. To a live human teacher, the onset of distress or frustration is usually obvious, signaling that immediate changes to instruction are necessary. For example, the teacher might give the learner a break, introduce a fun activity for a period of time, or begin introducing easier instructional concepts. These strategies will be utilized until the learner's mood has improved, after which a longer instructional period may recommence along with more challenging instructional tasks. These strategies are also used when the child is not paying attention adequately.

Just as a live teacher does, the system also uses strategies when an impaired state is detected (1908). In the domain of sustained attention, the system uses computer vision to detect the amount of time the child's vision is directed upon the viewing screen. Using a two-second whole interval recording method, the system calculates a percentage, which reflects the percentage of time the child's vision is directed upon the screen. A percentage of, say, 80% and higher is deemed acceptable. When sustained attention falls into the 70% to 79% range, a child's learning rate is less than ideal, and the system begins making adjustments.

Adjustments (1909), include 1) extending the entertainment period (allowing the learner to watch his video of choice for a longer period than usual, which functions as a break, to improve the learner's mood), 2) begin introducing easier instructional concepts, 3) making this data available in a report, so that parents and teachers are now highly aware of what types of tasks were frustrating for the child. In addition, the system is programmed with 4) motivational prompts, which help alleviate frustration in general. Responses consists of personalized audio, such as "You can do it, Johnny!", relaxation strategy prompts, such as "Let's take a deep breath together Johnny, 1, 2, 3 . . . ", transition prompts, such as "Let's take a short break, I have a fun video ready for you", and 5) humor prompts. Humor is one of the most effective coping strategies available for efficiently relieving stress and frustration in a child. Some examples of humor prompts include: a) short video events that are typically humorous to a child (such as a person slipping and falling down), b) silly actions, noises, and voices, c) the sound of laughter, d) incongruous images (such as a person wearing a mixing bowl as a hat), e) surprises and pranks, f) jokes and animation, and g) any other style of humor appropriate for the child's age. Based upon the child's age, AI selects humorous content appropriate for that age. The system then presents a variety of different types of video humor to the child, and data are collected on how the child responded. Using audio processing and computer vision, the system learns what types of humor the child responds to most frequently, and then presents those humor types more frequently. New humor types are also presented periodically, in order to discover new types of humor that are effective. A correlational analysis is performed on the video humor types presented. The analysis results in a Correlation Coefficient for each video, ranging from 1.0 (a perfect positive correlation, e.g. that particular video always creates user laughter) down to −1.0 (a perfect negative correlation, e.g. that particular video always creates a negative emotional event within the user). A Correlation Coefficient of 0.0 means there is no laughter created from that video (a neutral reaction). A Correlation Coefficient of 0.1 is small, a correlation of 0.3 is moderate, and a correlation of 0.5 and higher is substantial. The system identifies the video types and video producers who consistently produce a Correlation Coefficient of 0.5 and higher. Then, these are the videos that are offered the majority of the time to the learner, with new content also presented from time to time to discover new content with a substantial laughter correlation, which is then added to the user's high frequency video rotation. This process is known as Content Testing and Analysis. The result of this process is that it enables the system to have a robust video entertainment repertoire available at all times that is effective for the individual learner. The reason this is important is because effective videos maximize the learner's state of attention. This results in the most efficacious learning possible, when learning is integrated into the entertainment screen during the state of maximized attention.

Using computer vision, the AI system learns how to recognize an appropriate level of sustained attention. When the learner's vision has been directed upon the screen continuously for a preselected period of time, e.g., for 10 seconds, the system recognizes this appropriate level of sustained attention, and then automatically transitions the learner to the teaching screen. A single teaching point is presented during this state of sustained attention. This methodology is useful for learners with attentional challenges, because the system is presenting teaching only during an appropriate level of sustained attention.

The AI system also learns how to recognize too much stimulation. For example, during field testing, one particular subject consistently got a case of the hiccups after laughing for too long. A collaboration between the system's deep learning process, measurement systems, and the system's data inventory made it possible for the system to recognize the sound of the subject's hiccups. After hiccup recognition, the system played an audio recording: "go enjoy a drink of water, I'm going to pause your video", and then paused the entertainment video automatically. Upon the user's return, the system recognizes the user's face using AI facial recognition, and re-starts the video automatically. For this subject, the system will now continue to monitor for a reoccurrence of the hiccups (the second intervention for recurring hiccups is "go enjoy some more water and a 10 minute break. I'll make a beeping sound when 10 minutes are up").

The system performs a Master Analysis of all training data (discussed momentarily) to make adjustments in a wide variety of areas to create a more effective learning process, which is also more enjoyable for the learner. This Master Analysis results in the identification of Ideal Instructional Conditions for the learner (discussed next, in the detailed view).

Figure 20:
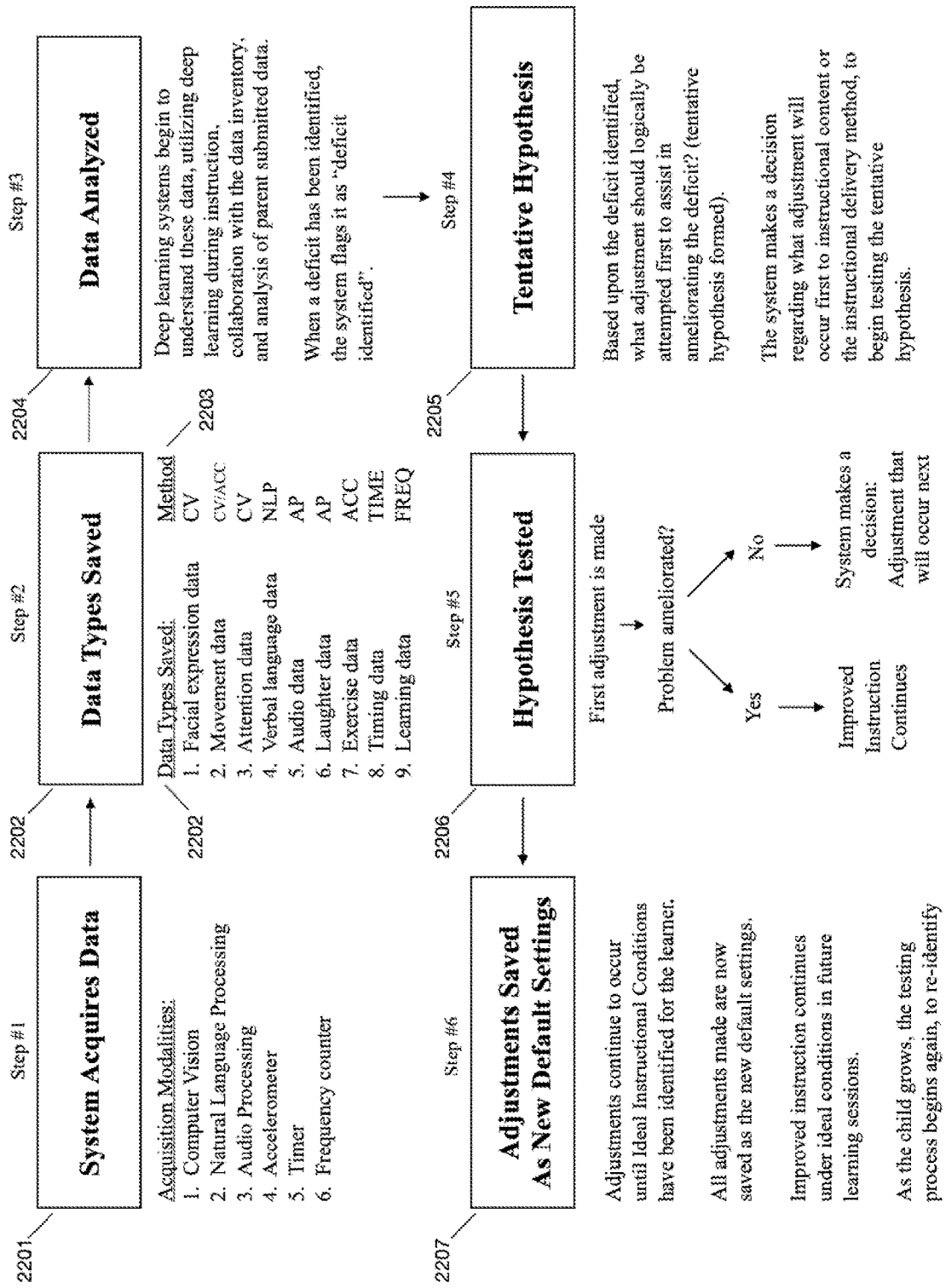
FIG. 20 is the detailed view of the Artificial Intelligence (AI) Architecture within the present invention.

FIG. 20 is the detailed view of the system. In 2201, the system collects large amounts of training data. These data are collected utilizing computer vision, natural language processing, audio processing, an accelerometer, the system's internal timer, and the system's frequency counter. With these acquisition modalities, the system gathers and saves a number of data types (2202), including data associated with: (1) the learner's facial expressions, (2) movement data, (3) amount of sustained attention, (4) verbal comments containing language, (5) audio data, (6) laughter data, (7) exercise data, (8) timing data, and (9) learning data (the learner's academic progress).

The first data type is facial expression data (2202, item 1). Utilizing computer vision (CV), 2203, the system continuously analyzes the learner's facial expressions, while (s)he is learning. In 2204, this analysis results in the system beginning to recognize facial expressions that are associated with negative emotions (frustration, anger, sadness, boredom, anxiety), and positive emotions (happiness, excitement, curiosity, surprise). In addition to acquiring data during the learning sessions, the system is also equipped with a data inventory, containing thousands of data items that are normed for the child's specific age and demographics. For example, when the system is working with a 9-year-old Latino male, it accesses the data inventory for this age and demographic, and begins to learn what frustration specifically consists of in analytical/visual terms in a 9-year-old Latino male. The data inventory within the present invention allows deep learning systems to begin to recognize emotions more quickly in the individual learner. Parents are also encouraged to submit photographs and video footage of their child. Parents may submit as many photos and videos as they like, which show the child's face during states of negative and positive emotion. These data are input to the AI system (which typically comprises a neural network), allowing the deep learning system to understand the individual child more quickly. The detection of negative emotions indicates that changes are necessary to the instructional environment. Positive emotions are an indicator of appropriate instructional conditions.

We will now discuss the remaining data types before proceeding further into the system design. The second data type is movement data (2202, item 2). Utilizing computer vision (CV) and accelerometer data (ACC), 2203, the system continuously monitors the learner's kinesthetic activity. A kinesthetic learner is an active learner; however, too much kinesthetic activity is a marker of agitation, overstimulation, or other factors that affect learning. The system algorithm monitors precise kinesthetic levels, to ascertain if the learner's levels are a reflection of a positive trait (engagement) or a negative trait (agitation/overstimulation). When the system discovers that the learner's movement is the result of a negative trait (4), the system flags the data as "deficit identified". Momentarily, we will discuss what happens next (in Step #4, 2205) after concluding our discussion of data types.

The third data type is attention data (2202, item 3), which is extracted utilizing computer vision (CV). The system uses computer vision to detect the amount of time the child's vision is directed upon the viewing screen. Using a two-second whole interval recording method, the system calculates a percentage, which reflects the percentage of time the child's vision is directed upon the screen. A percentage of 80% and higher is deemed acceptable. When sustained attention falls into the 70% to 79% range, a child's learning rate is deemed to be less than ideal, and the system begins testing adjustments.

The fourth data type is verbal language data (2202, item 4). Natural Language Processing (NLP) is utilized to analyze language-based articulations from the learner. When the system recognizes words and phrases that are commonly associated with negative emotions, the system responds with analysis (2204), a tentative hypothesis (2205), and testing of the tentative hypothesis (2206). The system goes beyond the analysis of language, as tonality is a significant part of the communication process. For example, when the learner articulates the word "no", this articulation could be a manifestation of negative emotion, or, it may be a neutral statement that simply answers a question. This is where the fifth data type is significant (2202, item 5). The extraction and analysis of audio data, utilizing audio processing (AP), allows the system to begin to understand the tonality of spoken words, and also non-language audio (an example of which is a child making noises that are commonly associated with distress). Children also make noises commonly associated with positive emotions. When the system recognizes audio commonly associated with distress, the same improvement protocol is followed (2204, 2205, 2206, 2207).

The extraction of laughter data, the sixth data type (2202, item 6), also occurs utilizing audio processing. The empirical importance of laughter data is discussed in the Neurochemicals and Learning section of this application.

Figure 9:
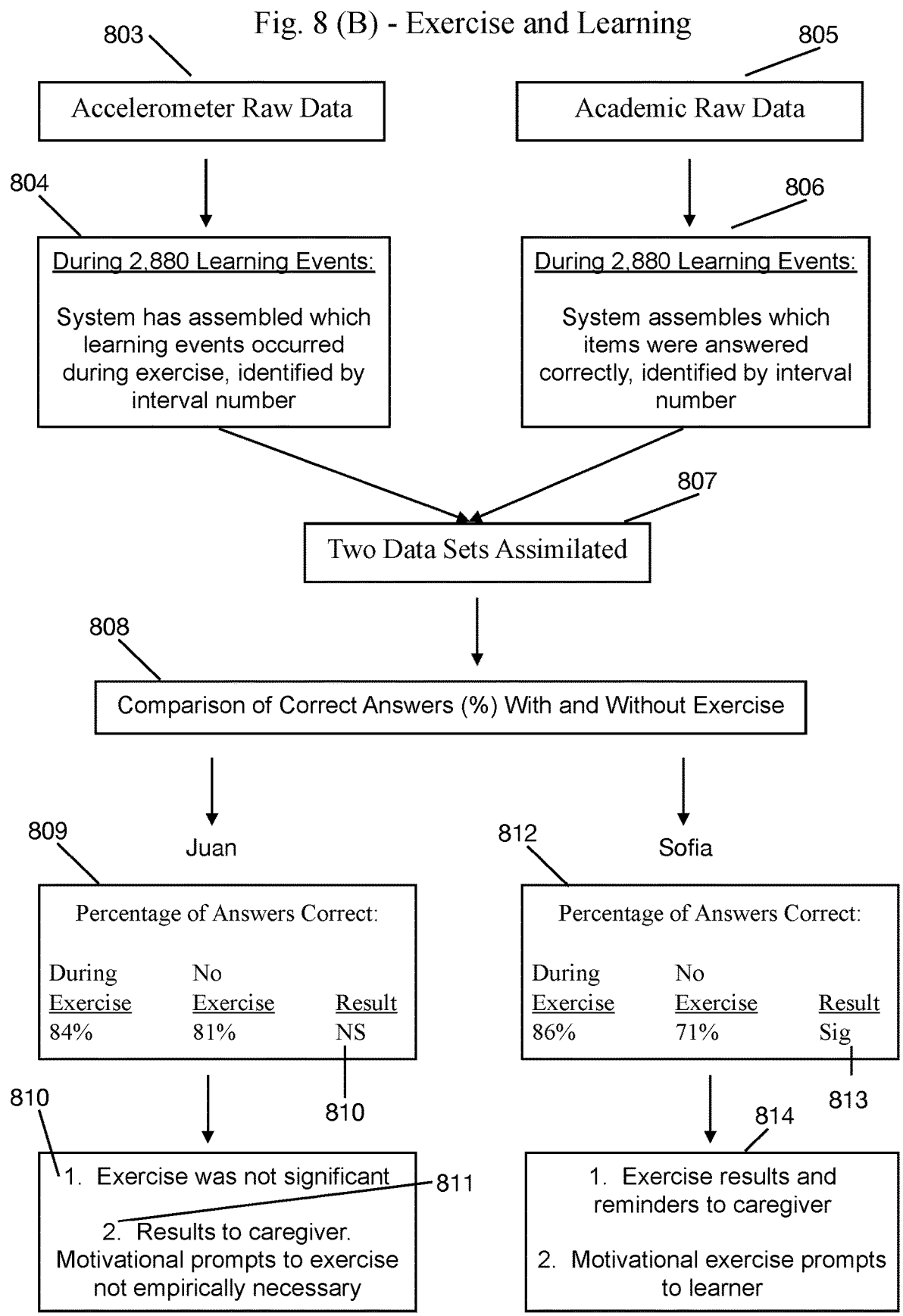
FIG. 9 illustrates a data set acquired during learning.

The final three data types are as follows. Using the device's accelerometer data (ACC), the system knows if the learner was in a state of physical exercise at the time of learning. The importance of exercise data is discussed in the Exercise and Learning section of this application. Timing data is extracted utilizing the system's internal timer and clock (TIME) to collect a number of different data points related to time and timing. The system is interested in identifying: a) the best time of day for the learner to learn, and b) how much instruction the learner can tolerate. With respect to timing, FIG. 9, item 6 discusses collecting the "time elapsed from presentation of answer choices and learner's entry response, associated with amount of time elapsed from overall start of video/teaching session". This data point is significant because children with attention problems respond inconsistently (e.g., when the amount of time it takes for the learner to respond varies significantly, it indicates to the system that an attentional problem may be present).

The final data type is learning data, which is collected with the system's frequency counter (FREQ), which measures the frequency of correct answers. For each of these data types, when a deficit is identified the same improvement protocol is followed (2204, 2205, 2206, 2207).

We have now discussed how the system acquires data (FIG. 20, 2201) and the types of data that the system saves (2202). We will now discuss the analysis of the data that have been extracted (2204). Deep learning systems begin to understand these data, utilizing deep learning during instruction, collaboration with the data inventory, and analysis of parent submitted data.

When a deficit has been identified, the system flags it as "deficit identified". For example, when sustained attention falls into the 70% to 79% range, the system flags sustained attention as "deficit identified". Now that a deficit has been identified, the system can begin to analyze the data set, and ultimately form a tentative hypothesis (2205), which will be subsequently tested with instructional changes (2206). Instructional changes occur based upon the reasons why children have attentional difficulties, and in this particular example, a child's sustained attention falls into the less than ideal range for five main reasons: 1) the type of entertainment video being watched is less than ideal, 2) duration of overall session is too long, 3) the number of words being taught simultaneously is too high, 4) the amount of entertainment time in between word teachings is too short, 5) the current instructional content is too difficult for the learner. After conducting the Master Analysis of all system data, the system makes a determination regarding which one of these factors is a likely cause of the attention problem (tentative hypothesis formed, 2205). The system has now made a decision regarding what adjustment will occur first to instructional content or the instructional delivery method, to begin testing the tentative hypothesis (2206). Testing of the tentative hypothesis begins with making one change, to either instructional content or the instructional delivery method. This one change is then tested (2206), and the system studies how the learner responds. If the problem is ameliorated, improved instruction continues. Usually, more than one change is needed to discover Ideal Instructional Conditions. When this is the case, the system maintains the first instructional improvement, and then also adds a second improvement. For example, when the system discovers that a child needs fewer teachings per minute, the number of teachings is reduced, and the data set is then re-examined. Upon re-examination, when the system discovers that a child may also benefit from a different type of entertainment video, new entertainment videos are sampled, and the data set is re-examined once again. This process of changing one variable at a time continues, with a re-examination of system data after each change. Sometimes, an adjustment results in less efficacious learning, and this is the entire purpose of the testing process. Testing occurs one variable at a time, to investigate deficiency causes with clarity. This process takes time, as many variables must be analyzed individually, but the end result is the discovery of ideal learning conditions. The layers of data that must be analyzed and adjusted have resulted in the creation of a deep learning algorithm, which can then be used to serve the individual, and other individuals with a similar learning profile. The present invention has been designed being mindful that the process takes time by designing a style of learning that is enjoyable for the learner. This being the case, the learner enjoys the extensive process of testing, regardless of how long it takes.

Once discovered, ideal learning conditions are now saved as the new default settings (2207). Improved instruction continues under ideal conditions in future learning sessions. Ideal learning conditions are usually valid for weeks or months. As the child's development continues, ideal learning conditions change as the child grows. For example, when a child no longer finds a particular type of video interesting, the AI system recognizes this, and the testing process begins again, to re-identify ideal conditions.

Master Analysis of Aggregate Training Data

Figure 21:
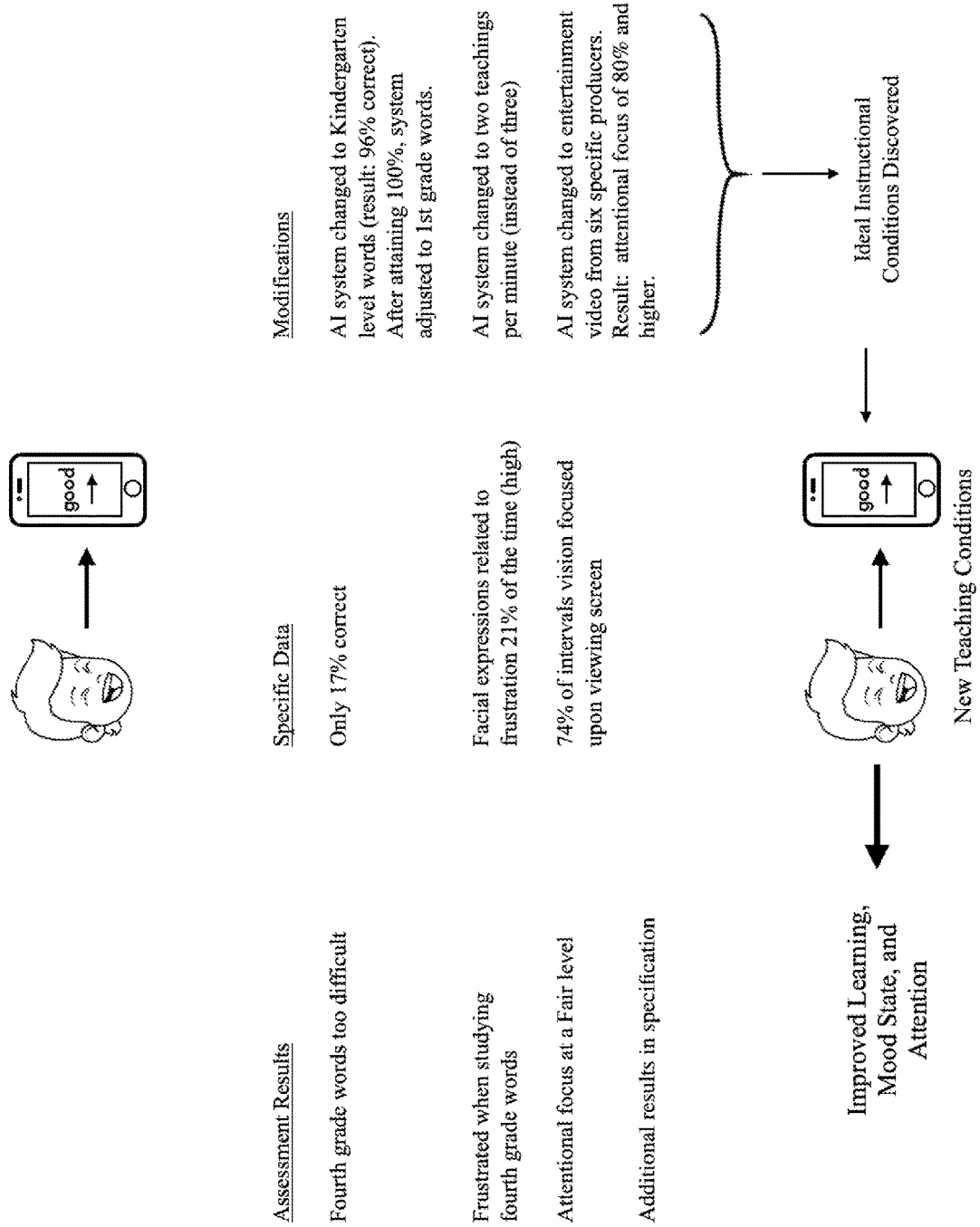
FIG. 21 is an illustration of the AI system identifying ideal instructional conditions.

At this point, the system has acquired a large amount of training data. It is now possible to conduct a Master Analysis of all training data, comprehensively. The Master Analysis results in determining the learner's Ideal Instructional Conditions (further detail below). To review, data have been collected in three domains; (1) academic progress (learning words), (2) emotional mood state (contentment or frustration), and (3) level of sustained attention (paying attention at an adequate percentage, or not). When a child is doing well in all three areas, the system has identified the learner's Ideal Instructional Conditions. When a child is not doing well in one or more areas, the system continues to make adjustments to further refine instructional conditions. In FIG. 21 (Results, Data, and Modifications), the system has identified ideal instructional conditions for Samuel, a fourth grade male with dyslexia. Samuel's ideal instructional conditions consist of the following customizations identified by the system:

Academic: teaching words at a first grade level (instead of fourth grade)

Emotional: teaching two words per minute (instead of three)

Attention: utilizing entertainment video from six specific producers, which consistently created attentional focus of 80% and higher for Samuel.

The AI system also made the following adjustments to Samuel's learning program. Instructional sessions were shortened to 23 minutes initially, based upon the system recognizing a degradation of attention after 23 minutes. After Samuel's Ideal Instructional Conditions were identified, it was possible to extend Samuel's sessions back to 30 minutes. Samuel exhibited a higher percentage of correct answers and better attentional focus in the morning, as compared to the afternoon. Subsequently, the system made a recommendation to Samuel's caregiver to ideally conduct learning sessions in the morning. Finally, the system discovered that Samuel answered more questions correctly (+4%) when learning was presented immediately following a humor event in the entertainment video. This allowed the system to switch Samuel to the Between Clips Method and to utilize humorous videos more frequently from selected producers.

This Master Analysis of aggregate training data allows the system to continue making adjustments, until all three areas have reached optimal levels. Now, the system is maximizing instructional efficacy by utilizing (1) ideal videos for the individual, (2) ideal teaching content for the individual, and (3) ideal instructional conditions for the individual. In other words, when the learner is a) in a good mood, b) paying attention, and c) working at the correct instructional level, learning conditions are ideal, and the learner begins to learn more quickly, and without emotional distress. This results in ideal overall conditions for the individual learner, which serve the child from both a learning perspective and from an emotional one.

Specifics of Targeted Instruction

Figure 22:
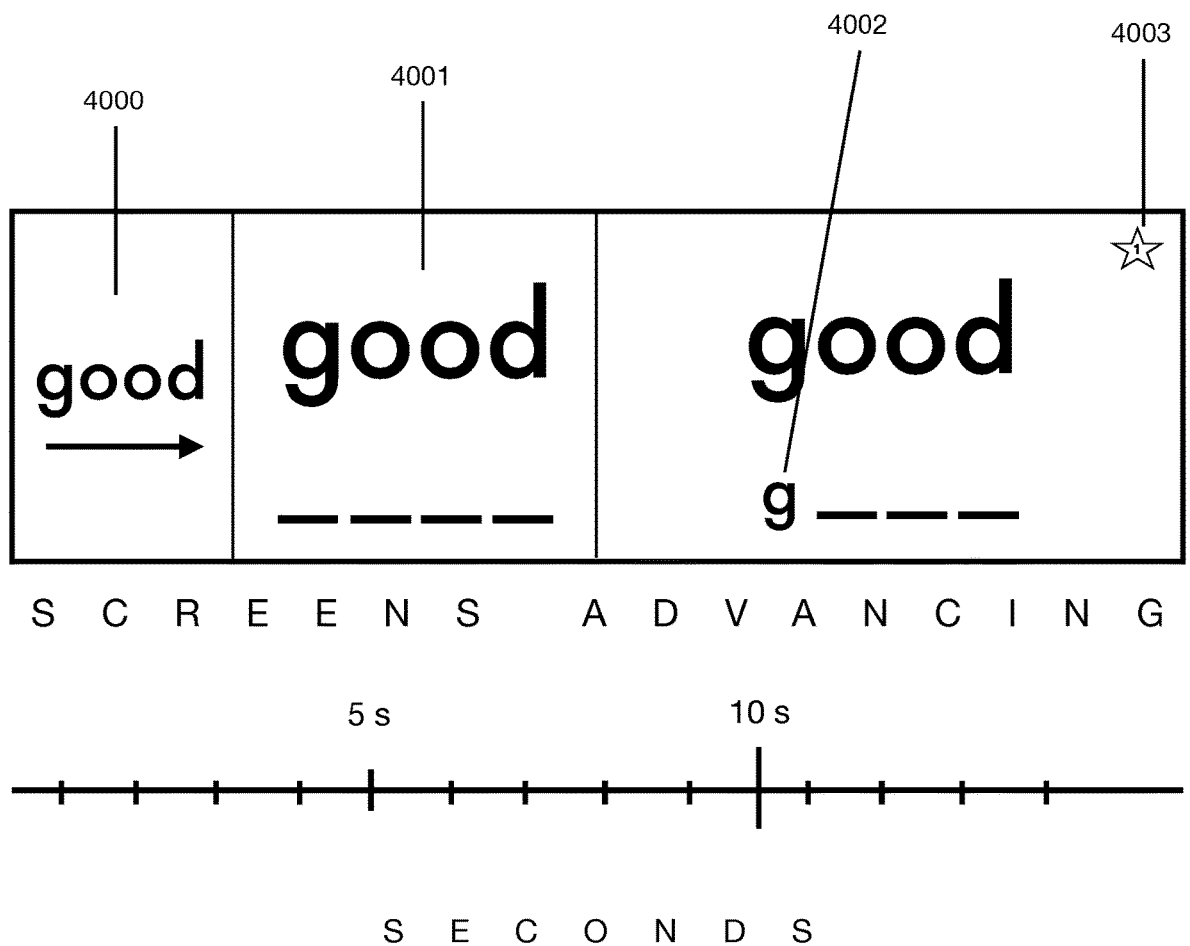
FIG. 22 is an illustration of the Targeted Instruction methodology within the present invention.

FIG. 19, item 1904 illustrates the importance of targeted instruction. When the learner is deficient (has not yet learned the anticipated curriculum), the system introduces specific instruction designed for the deficit area. This consists of targeted instruction specifically upon teaching points that have not yet been learned. With targeted instruction, a unique teaching methodology emerges. For unlearned content, the system now switches to a different instructional method, Targeted Instruction, which spends more time on the unlearned teaching points (FIG. 22). The new instructional method continues with the Continuous Engagement Method (FIGS. 15 and 18), but in this example, each single-word teaching point now becomes more interactive. A word transitions onto the screen automatically to quickly re-teach the word (4000), and then the screen changes (4001) with blank spaces below the word, for the learner to type out the word, one letter at a time. This screen is used first, with the word present above the spaces as a model, so that early readers can experience success spelling the word for the first time with a model present. In 4001, the word "good" has four blank spaces below the word, and the system plays an audio recording of the word, and the keyboard appears on the screen. The system's internal timing mechanism begins to run, and if the learner has not typed "g" within five seconds, the system plays an audio recording of the sound associated with the letter "g" (an individual letter sound is known as a phoneme, and this sound is abbreviated with /g/). After playing the /g/ sound, if the learner has not typed "g" within three seconds, the system types "g" for the user (4002), and the letter "g" appears visually on the first blank line below the word, simultaneous with an audio recording of the phoneme (/g/). The system now plays an audio recording of the sound associated with the remainder of the word, in this case: /ood/. If the learner has not typed "o" within three seconds, the system plays the following audio recording: "find the next letter in the word 'good'". If after three seconds the learner has not typed "o", the system types "o" for the user, and the letter "o" appears visually on the second blank line below the word, simultaneous with an audio recording of the letter, simultaneous with an audio recording of "'o' is the next letter in the word 'good'". When the learner spells a word correctly, the word flashes once, and a chime sounds. The chime sounding indicates that the user has earned a point, within the motivational component of the program, and a point is added to the point tracker area of the screen (4003). In 4003, the user has earned one star with their correct answer, and points may be redeemed for rewards.

Field observation has revealed that children are more intrinsically motivated to learn when also earning something that is important to them; therefore, the system allows the child to choose their own Avatar, which can be customized with earned rewards. The point tracker area (4003) provides a continuous visual reminder to the child of how many points have been earned thus far.

Figure 23:
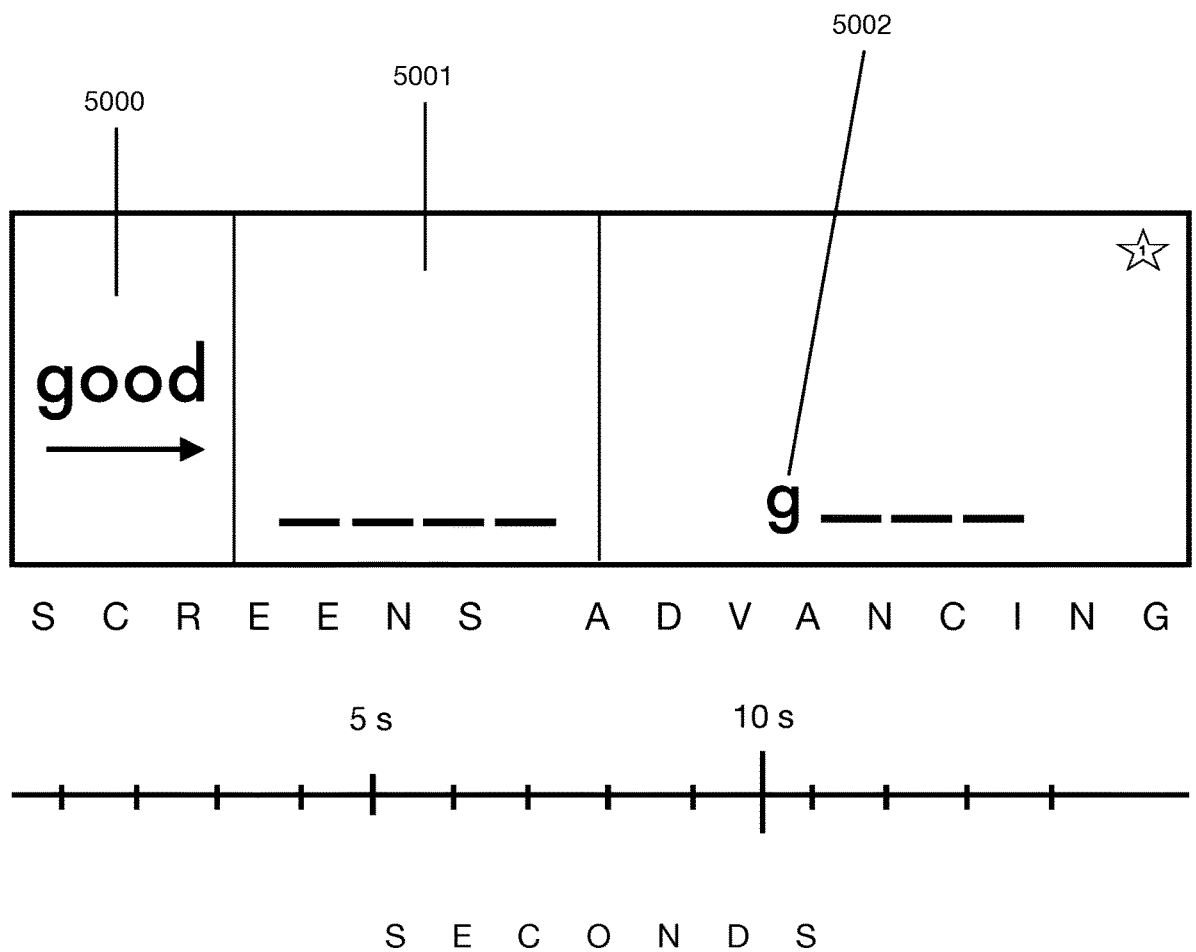
FIG. 23 is an illustration of the Advanced Targeted Instruction methodology.

FIG. 23 illustrates Advanced Targeted Instruction, which is for more proficient or advanced learners. In 5000, the word is quickly taught again, and then the screen changes to 5001, which contains only blank spaces for each letter, without the model word. In 5002, when the learner struggles to spell the word, the same protocol as previous is followed. At the end of a teaching point, the user is automatically transitioned back to the entertainment video, which auto-plays from the point the user left off.

Length of Sessions

During this lengthier process, the AI system monitors the learner's emotional mood state, and sustained attention. When the system detects the early signs of frustration and other negative emotions, the system begins making adjustments (FIG. 22). Specific to the domain of timing (2202, item 8), the system records within the database (620) the number of seconds that it took for the learner to exhibit negative emotion. The system continues to update the database with onset to negative emotion timing. This allows the system to make adjustments to the duration of forthcoming instructional segments. For example, when a learner consistently becomes frustrated after 17 seconds of instructional time, the system terminates future instructional segments at 80% of the average onset to frustration time. Example: 80% of 17 seconds is 13.6 seconds, and the system will now terminate future instructional segments at the 13 second point (rounded down from 13.6 seconds). Field experience has shown that most learners become accustomed to longer instructional segments over time. The AI system continuously monitors this data. As the learner's ability to tolerate longer sessions increases, the system begins extending the length of the sessions accordingly. In this actual field example, the learner's early signs of frustration extended from onset at 17 seconds to onset at 25 seconds after four days of using the present invention. As the learner's tolerance for longer sessions increases, learning efficacy increases as well. In this example, the learner could not tolerate learning to spell the word "good" on day one, but after four days of using the present invention, he was able to spell the word. In summary, targeted instruction continues for as long as possible, given the learner's current ability to tolerate instruction. Instructional sessions are gradually lengthened over time. The learner is permitted to grow at the pace that he is realistically able to grow at, using a methodology that mitigates frustration and provides enjoyable micro-breaks of entertainment.

Data for Teachers and Parents

The data within the AI system improves instruction, but is also compiled into different graphs, for the learner's caregiver and teachers. When parents and teachers now understand that a learner can tolerate only 17 seconds of instruction, they are able to make well-informed decisions regarding the type of instruction that should be utilized with the learner at this moment in the learner's development. In FIGS. 22 and 23, the targeted instruction process concludes with the system repeating the targeted instruction, using the instructional method that is enjoyable for the student, until the content area is mastered. Then, the system moves along to the next priority area of instruction, using the same instructional protocol (brief instruction first, followed by targeted instruction for unlearned items, with AI adjustments at early signs of frustration, and gradual extension of the instructional segments).

AI customizations Specific to the Domain of Sustained Attention

AI customizations are driven by the reasons why a child's sustained attention falls into the less than ideal range. This degradation of attention occurs for five main reasons:

1) Type of entertainment video being watched

When the child is watching an entertainment video that is highly engaging (enjoyable), the child's attention is maximized to the highest possible degree (generally 80% and higher). When sustained attention falls to 79% or below (Level 1 Impairment), the computer system records this data point, along with the video that was being watched at the time. Attentional Impairment is also classified at additional levels of severity:

Attention of 69% or below=Level 2 Impairment
Attention of or below=Level 3 Impairment
Attention of 49% or below=Level 4 Impairment Over time, the AI system learns what types of videos are the most engaging to the individual. Then, the most engaging video types are precisely the video types that are offered in the "Favorites" section of the child's video selection screen. The outcome of this customization: only videos that result in an optimal state of attention are presented, which then results in a more efficacious rate of learning.

2) Duration of overall session

The system records the overall length of the child's video viewing session. Eye fatigue begins to occur at approximately 20 minutes of elapsed screen time usage. When eye fatigue onsets, attentional impairment and learning efficacy are also reduced. Therefore, the length of the video session is continuously monitored, and the learner is transitioned into an optional break after 20 minutes of elapsed screen time usage. This optional feature may be disabled by the child's caregiver in the event that a longer video viewing session is needed for a particular reason (such as a long car ride). Overall viewing duration is also saved as system data for an additional reason: when the child's frequency of wrong answers consistently occur beyond a certain duration, the system learns this. For example, when Johnny consistently begins making errors after 16 minutes of elapsed viewing time, the system then begins offering Johnny's break sooner. This also allows the system to make highly customized recommendations to the child's caregiver (example: Johnny consistently begins making errors after 16 minutes of screen time. Consider having Johnny take a break after 16 minutes of screen usage. Would you like to turn on the "mandatory break" function after 16 minutes of screen usage?") When the caregiver selects "yes", the system automatically transitions the child into a break at the specified time. The child is unable to make video selections until the end of the default five minute break period (the length of the break is customizable by the child's caregiver). This system algorithm gives the user a screen-free break at the most appropriate time for the individual. This allows for the effective mitigation of eye fatigue, a refreshed mood following the break, and allows for the start of a new, productive learning session.

3) Number of words being taught simultaneously

Certain learners learn more effectively when studying just one word repetitively, for a certain length of time. More efficient learners can study six or more words simultaneously. The system monitors the child's progress carefully during the starting default setting of teaching three words simultaneously. When learning efficacy is less than ideal, the system automatically reduces the number of words that are being taught simultaneously. This allows the learner to focus exclusively on one word at a time, which consistently increases learning efficiency for individuals on the severe end of the reading difficulties spectrum.

4) Amount of entertainment time in between word teachings

For the typical (middle of the bell curve) learner, three structured learning events per minute are generally ideal (more or fewer events can be selected by the learner's caregiver based upon individual differences in learning style). Three events per minute allow for approximately 17 seconds of entertainment time in between word teachings. Some learners, with low frustration tolerance, require additional entertainment time in between word teachings. When training data reflect high levels of frustration following the transition to learning, the system automatically adjusts the teaching schedule to two word teachings per minute (27 seconds of entertainment time in between word teachings). If high levels of frustration continue, further adjustments are made, until an appropriate schedule is identified for the individual learner, which mitigates frustration.

5) The current instructional content is too difficult for the learner

Traditional teachers expect a fourth grader to be reading at a fourth grade level. Unfortunately, this is not a universal reality. When the fourth grader is reading at a first grade level, but studying fourth grade level words, attentional challenges are likely. The learner exhibits numerous off-task behaviors in order to escape from instructional content that is too difficult. After studying the learner's frequency of wrong answers, when the system discovers that instructional content is likely too difficult, the system makes changes. In this case, the system will begin presenting words at a kindergarten level, in order to allow the learner to experience success, and the positive behavioral momentum associated with success. When the learner's attitude has improved, (s)he is now more motivated to learn.

Processing Learner Responses

Text entries by the learner and natural language processing (NLP) are utilized to process the learner's responses, and to classify them as correct or incorrect.

Deep Learning Systems and Informing Instruction in All Environments

At this point, deep learning systems have accumulated data sets that are valuable to an electronic teacher. The same data sets are also valuable to the child's teacher and parent. Within the parent portal, the parent may select "print comprehensive assessment report", upon which the system prints a report detailing the difficulties for the learner. This report can be shared with the child's teachers to allow for specific informed instruction in the specific problem areas, and for customizations to learning conditions that are ideal for the child.

FIG. 24 illustrates the most relevant demographics for fruitful use of the present invention. The Figure is rank-ordered, with the most applicable demographic at the top (Severe Special Needs learners, for which the innovation is Critically Useful). The present invention is Very Useful for normally developing children, aged 3 to 8, and Useful for normally developing children, aged 9 to 13. It is Less Useful for normally developing children, aged 14 to Adult, and Useful for some learners in this demographic with specialized learning profiles (less severe ADHD, autism, etc).

Severe Special Needs Learners

Severe Special Needs learners cannot pay attention to traditional reading instruction, but are absolutely captivated by screens. Herein lies the final point of novelty within the present invention:

(4): A learning system for severe special learners, where reading instruction occurs on the screen with automatic conversion back-and-forth between screens, and continuously maintained engagement... a system that finally makes reading instruction easily accessible for this unique demographic.

Many special needs children (e.g., those having ADHD, autism, dyslexia, memory impairment) have great difficulty learning to read, partially because they cannot pay attention to traditional reading instruction at all, and secondly because these learners require massive amounts of repetition to learn.

The present system provides the special needs child with a unique way of accessing hundreds of learning events per day, in a manner that is readily accessible given the impairments they have. These children have a limited attention span, but a high affinity for screen time. This innovative method is a vital component in the child's literacy development.

The present invention is highly beneficial for the dyslexic population. Letter and number reversals are common in dyslexia. The evidence-based remedy for reversals is repetition. Sometimes thousands of repetitions are necessary to remedy reversals for some children. The present invention makes it easy to execute thousands of repetitions quite efficiently. Experience has shown that the best of teachers simply do not have the time available to help children with such severe needs. Many of these children fall through the cracks, and never learn to read proficiently. All of our kids have the right to learn to read, even if it takes thousands of extra hours to teach them. This invention can help with the heavy lifting.

Keeping the attention of a child with severe ADHD or autism is extremely challenging, even for a trained professional. For the parent of a special learner, it is even more difficult to keep the child's attention during learning tasks. A novel approach is needed.

Referenced earlier, Bedor et al. took innovation one step forward with its published patent application in 2020 (WO 2020/032965 Al Feb.13, 2020) and made the following relevant connections in the ADHD domain: " . . . education is currently struggling to capture the attention and interest of students with flat black and white textbooks, long class lectures and boring assignments. Today's students are growing up as digital natives who have been inundated by flashy, bright colored and stimulating content on television, tablets and phones since they were born. Education has failed to keep pace with the production quality and innovative presentations of the rest of the media industry. As a result, students are less engaged by traditional course content. Students also find it more difficult to concentrate on less sensory-stimulating materials. This issue is further exacerbated by rising rates of health issues, like: . . . attention deficit hyperactivity disorder (ADHD), which make it harder for impacted students to study in seated classroom environments . . . . There is a need for educational options that can compete with polished mainstream media stimuli and capture the attention of students who find it hard to learn in typical classroom environments". Bedor, paragraph [0011].

Bedor et al. proceeded to disclose a novel video-game style learning experience for high school students. The present invention has innovated in a completely different direction. And the invention finally solves the problem for these learners. The child's favorite programming keeps the child's attention at the highest possible degree. And then, the system automatically inserts the learning tasks into the child's favorite programming, when the child's attention is at its highest. The child's learning is maximized, and the parent's exhaustion and frustration are mitigated.

Why the Present Invention is Effective in Teaching Children to Read

In the middle of the average range, a typically developing child spends approximately 5 hours per day engaged in entertainment screen time. Without the present invention, current technology does not blend in any structured learning content (zero learning events). With the use of the present invention, the calculations are far different:

For screen time usage of 5 hours per day, the system automatically blends in 3 learning events per minute. This equates to 180 learning events per hour, or 900 learning events over the 5 hour period. Under these innovative conditions, the child's screen time now contains 900 learning events, as compared to 0 learning events.

Let's say a child had a lower amount of screen time usage per day: 3 hours. At 180 learning events per hour, 3 hours of screen time still produces 540 learning events per day.

Finally, if a child had just one hour of screen time usage per day, this still yields 180 learning events. This allows for 30 repetitions of 6 different words. For the vast majority of children, 30 repetitions is more than sufficient in order to have a new word fluently memorized.

This means a child will generally learn a minimum of 6 new words in just one hour of screen time usage per day with the present invention.

This is where math ignites the true power of the present invention. The top 300 highest frequency words in English make up approximately 65% of all written material a child sees in our world. It is absolutely crucial for children to completely master these 300 words as quickly as possible. The school system expects children to have these 300 words mastered by the end of 3rd grade. With the present invention, it is completely realistic for a child to have these words mastered by the end of Kindergarten instead, massively accelerating the child's growth.

300highestfrequencywords=300 words mastered in just 50 hours of instruction. Learning 6 words per hour (which is just 50 days at one hour per day, or 100 days at 30 minutes per day).

These results have been borne out consistently in actual observation in the field when working with struggling readers. For English language learners, when the learner has proficiently mastered 3,000 words, (s)he can understand approximately 90% of everyday English conversations, English news articles, and English used at school and in the workplace. 3,000 words are mastered with approximately 500 hours of instruction with the present invention. While 500 hours sounds like a lot, we need to remember that we're dealing with the vast complexity of learning a new language, and also remember that learning is automatically interwoven into the learner's normal everyday life, without the need to intentionally "sit down and learn", thereby making the language learning process an enjoyable part of the learner's normal daily routine.

Languages Other Than English

The system also teaches reading and language learning in languages other than English. All languages can be broken down into individual components of the language, allowing instruction in bite-sized segments of 10 seconds or less per learning point with the present invention.

Additional Embodiment of the Present Invention

Another embodiment of the present invention is Direct Video Editing. With Direct Video Editing, the learning events are edited directlyinto the entertainment videos, creating one seamless video containing entertainment interspersed with bits of learning. The main benefit of Direct Video Editing is that it can be utilized without a connection to the server (videos may be loaded directly onto the device). However, there are downsides to Direct Video Editing. Because the end result is only a video, Direct Video Editing does not permit the usage of AI functionality and all of the benefits that come with AI.

Not a Substitute for Off-Screen Learning

An important point of emphasis is that even highly innovative screen time learning is not a substitute for off-screen learning. There is no substitute in the world for high quality face-to-face instruction from a parent or teacher.

Even a highly innovative system could never replace this, and it is not intended to. The present innovative screen time learning invention has a different purpose: to simply add value to the learning process. Primarily, to help children who are still behind despite years of face-to-face instruction, and also for parents who wish to accelerate their child's growth early.

Advanced Features and Additional Functionality

The system database (620) is normally equipped with thousands of words in total, which includes all of the highest frequency words plus thousands of additional words, in numerous specialized areas. The system begins teaching the child at a level that is appropriate for the individual child, while making customizations along the way using artificial intelligence. This allows a child's literacy to grow carefully and methodically, word by word. As words are mastered, new words are continually added. The vocabulary presented grows as the child grows, making the present invention useful for years (or until the learner has learned to read or fluently mastered the new language).

Parents are able to select domains of personal interest for the child, which allows the system to customize word choices based upon these domains of personal interest. The system then customizes the next learning session with unlearned words and new words. Learned words are also occasionally presented again for review purposes.

The system has a customizable word feature, whereby the parent may access their parent portal, and type in the child's weekly spelling words from school. The system will then begin teaching each of these words, one at a time.

As the learner's reading and language proficiency grows, the system advances from teaching single words to teaching multi-word expressions, phrases, and sentences. It is important to teach one word at a time for young learners who are not yet fluent readers. A child learns best in small bite-sized pieces. This is especially true for children with special learning needs, but even children with a normal learning profile benefit from learning one word at a time. For older children, the system goes beyond just teaching the word itself. The system also provides a definition of the word and provides an example of the word used in a sentence. This allows the child to learn words within proper contexts, and not just as stand-alone words.

At any time, the parent may access their parent portal and select "print practice words". The system generates age-appropriate lists of the words the child has not yet learned. The parent may practice these words with the child directly to reinforce learning and create a learning bond between parent and child.

At any time, the parent may access their parent portal and select "print reinforcement chart". The system then generates an age-appropriate visual reinforcement chart, where the child can see her progress over time. In addition, at any time the child may visit the Reward Store, a virtual redemption center within the system, where the child may review the rewards that are available for earning, and also redeem earned points for rewards.

The artificial intelligence features may be turned off if the parent desires. There may be times when visual and auditory monitoring of the child is not desired or feasible, and the system will still function with AI features turned off. This mode is referred to as "teaching only mode". In this mode, the system continues teaching words without monitoring for emotional and attentional states.

The system contains an optional embodiment that exists to build independence and responsibility for older children. A feature is available where the system teaches a word, and the word then remains on the screen. The purpose of this is to allow older children (who possess enough self-discipline) to study the word for a longer period of time. The older child then enters a command to return to their enjoyable activity on the device. A second option is also available which removes the need to enter a command (the target word simply remains on the screen longer, and then the child is automatically transitioned back to the entertainment screen). There is also a repetition feature available, where learners press a command a specified number of times to hear the word repetitively, making a stronger impression upon the learner's memory.

The present invention is not just for children, and is not just for learning reading. It is ideal for a busy adult who desires to learn a new language. Adults spend many hours each day utilizing screen-based devices. This represents much lost learning opportunity. With the present invention, a busy adult now possesses a convenient way to learn a new language, in small manageable pieces.

It is important for the visual size of the presented word to occupy a large area on the screen, to the highest degree practicable (72 to 96 point font size is ideal for an arms length viewing screen). The reason is that a larger visual image of the word makes a larger cognitive impression upon the child's visual processing and memory systems (which subsequently facilitates more efficacious learning). Extraneous visual stimuli should be minimized. The small point tracker is acceptable for motivational purposes. Otherwise, only the target word should appear on the screen to the largest degree possible. Contrast should be maximized (white background and black word, for example).

The automatic transitioning feature is highly effective in terms of gaining the child's cooperation. Children acclimate rapidly, and quickly realize that "when I'm watching a fun video, I'm also learning my words. This is just how it works". Arguments between parent and child are now mitigated and learning is accepted as a normal part of life.

The present invention offers parents an organized way to monitor their child's reading level with these advanced features, to ensure that the child's literacy is being well managed and assessed continuously. Monitoring and managing a child's reading progress is no longer an overwhelming, confusing task. The present invention makes the process easy for parents to manage, and fun for children to use.

Figure 25:
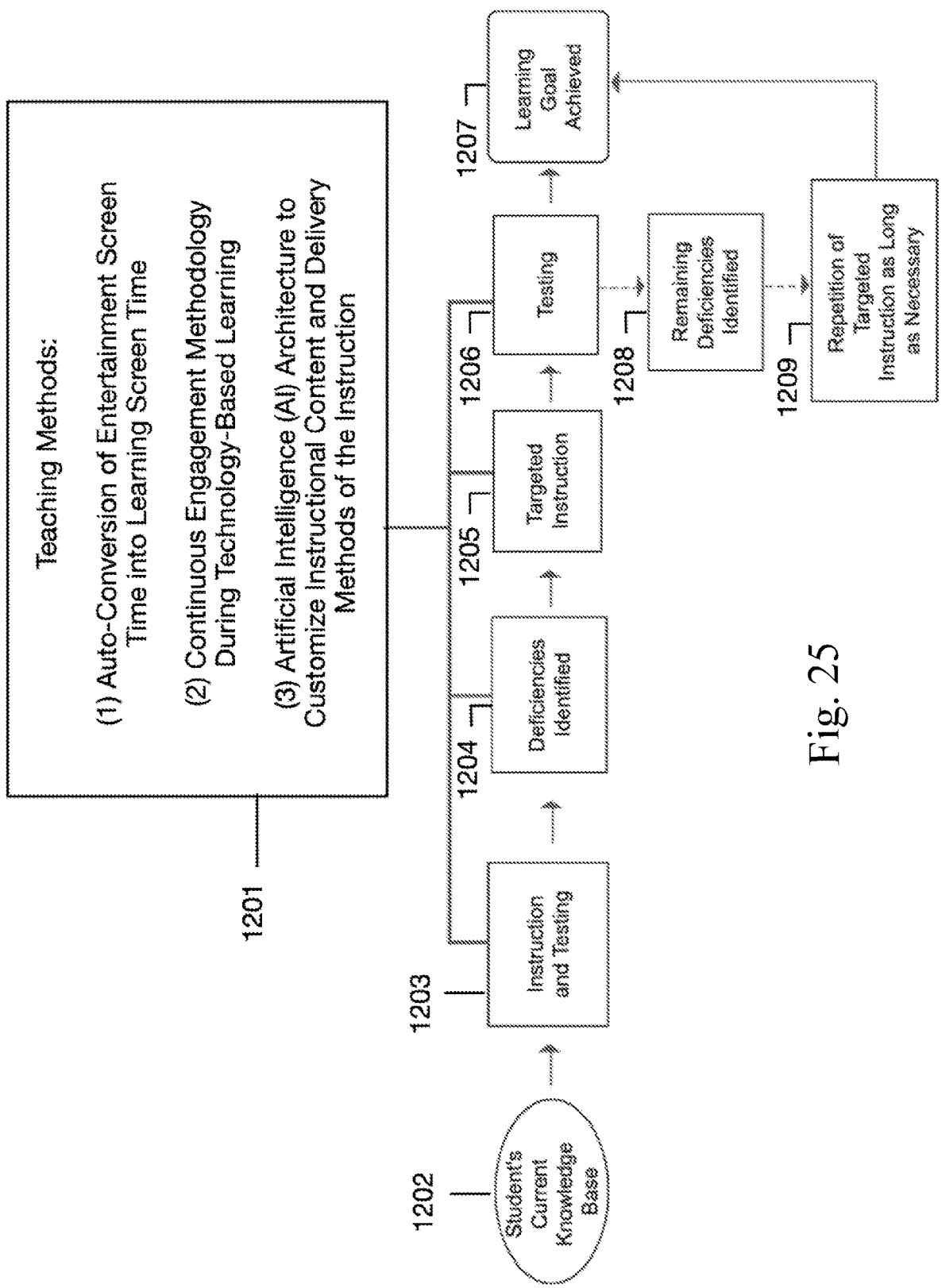
FIG. 25 is a flow chart that illustrates how the present inventive teaching methods are delivered to the learner.

FIG. 25 is a flow chart that illustrates how the present innovative teaching methods are delivered to the learner (1201). All learners enter with a current knowledge base, 1202. For example, a 5-year-old child has limited word knowledge. Instruction begins at a level that is appropriate for the individual learner, 1203. Subsequent testing identifies which words the child has yet to learn, 1204. Targeted instruction then begins, 1205, which focuses specifically upon the words the child has not learned yet. Follow-up testing then occurs, 1206. If the child has learned all target words, the learning goal has been achieved, 1207. If the child has not yet learned all words, remaining deficiencies are identified with additional testing, 1208. Repetition of targeted instruction then occurs for as long as necessary, until the full set of words has been fluently mastered, 1209, allowing the learning goal to be achieved, 1207.

Figure 26:
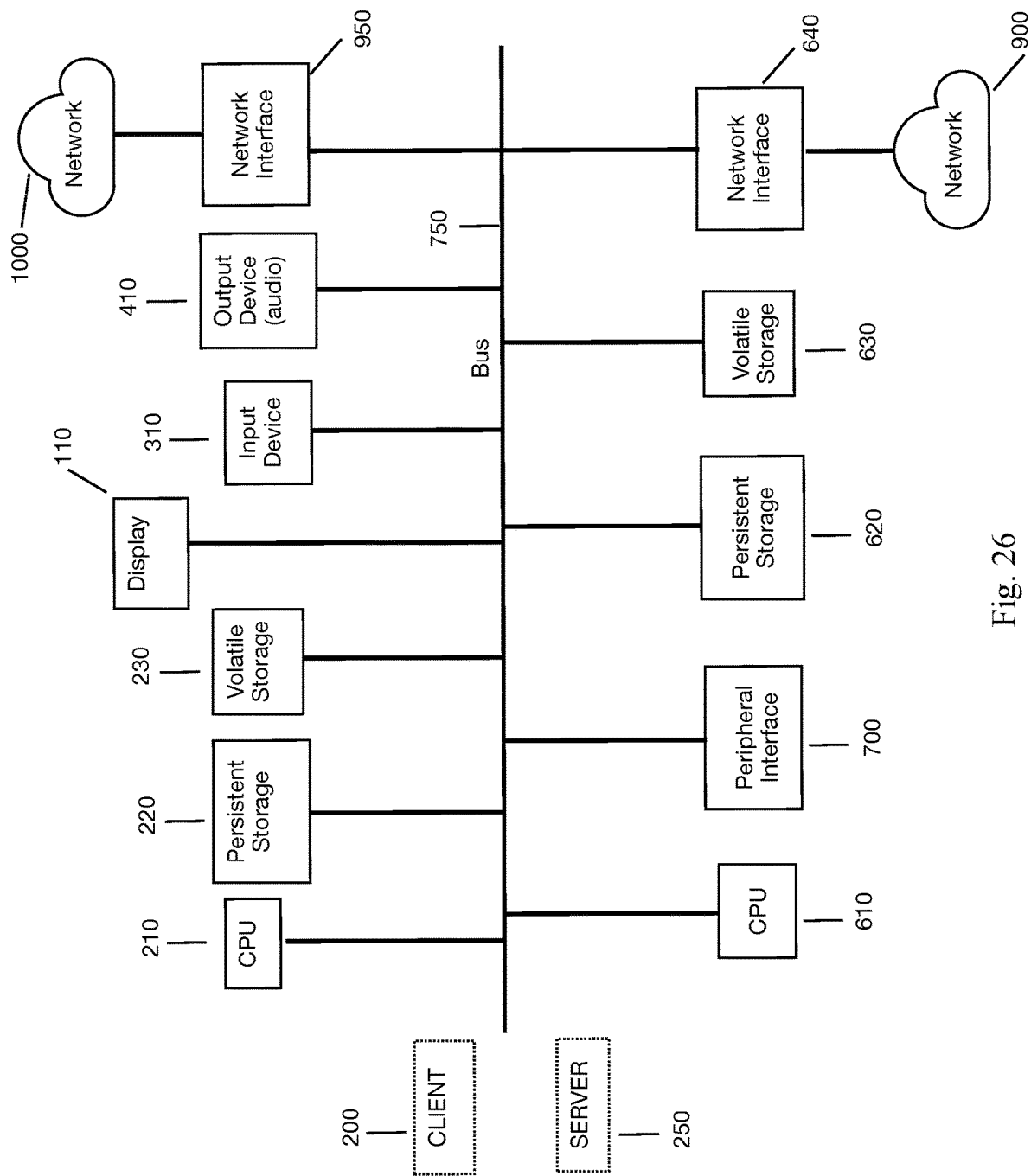
FIG. 26 is a block diagram of an example computer system that can implement the present invention.

FIG. 26 is a block diagram of an example computer or processing system that can implement the learning system described herein. In a presently preferred embodiment, the Client side (200) includes a CPU (210), persistent storage (220), volatile storage (230), visual output device (110), input device (310), audio output device (410), network interface (950), and a cloud based network (1000). The Server side (250) includes a CPU (610), peripheral interface (700), persistent storage (620), volatile storage (630), network interface (640), and a cloud based network (900). A Bus (750) is used to transfer data between the Client and Server. System instructions may be written utilizing a variety of languages, and may include C, C++, CSS, Chromium Embedded Framework, Cosmos, Java, Java Script, HTML, HTML5 video, GStreamer, Go, Node.js, Python, PHP, Lua, Qt, Ruby, Swift, Objective-C, Video JS, Rails, ASP.NET, Angular, React, React Native, Vue, C#, Kotlin, Big Table, and/or MariaDb. The system may also be integrated into existing video streaming platforms, which may include YouTube, TikTok, Netflix, Hulu, Disney+, Amazon Prime Video, Paramount+, HBO Max, Peacock, Apple TV+, BBC iPlayer, ITV Hub, Tencent Video, Youku, iQiyi, Hotstar, DouYu, and related subsidiaries.

This illustration is only one example of a suitable processing environment, and is not intended to suggest any limitation as to the scope of use or functionality of embodiments of the methods described herein. Examples of well known computing systems, environments, and configurations that may be suitable for use with the processing system shown in FIG. 26 may include but are not limited to: handheld devices, laptop devices, desktop computer systems, tablet devices, smart television devices, programmable consumer electronics, cloud computing environments, or other appropriate electronic devices. The computer system may be described in the general context of computer system executable instructions being executed by a computer system. Program modules may include routines, programs, objects, logic, and data structures that perform particular tasks or implement certain types of data. The computer system may function in cloud computing environments where tasks are performed by remote processing devices that are linked through a communications network. Program modules may be located in both local and remote computer system storage, and make use of volatile storage as needed.

The above description is included to illustrate the operation of preferred embodiments, and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A computer-implemented method for using an artificial intelligence module to perform automatic screen switching during the watching of an entertainment video by a learner to create learning and continuous engagement opportunities for the learner, said method comprising the steps of the artificial intelligence module:
   monitoring the learner's academic progress and simultaneously monitoring the learner's emotional mood state during a given learning period; and
   using information gathered from the monitoring step to adjust the instruction presented to the learner in a subsequent learning period;
   whereby learning is automatically and unobtrusively woven into the entertainment video, thereby enhancing the ease and effectiveness of learning.

2. The method of claim 1 wherein the learner is initially engaged in entertainment screen time on a monitor coupled to the computer, said method further comprising the step of the artificial intelligence module:
   automatically converting the entertainment screen time into a learning period at one or more specific instances during the entertainment screen time.

3. The method of claim 1 wherein continuous learning engagement is employed during the watching of the entertainment video, said method further comprising the step of the artificial intelligence module automatically switching the learner back to the entertainment video at the conclusion of a learning period for refreshment and to automatically maintain the learner in a state of focused attention.

4. The method of claim 1 wherein the
   entertainment video is provided by a video streaming manufacturer, editor, distributor, or related video creation entity, and the learning occurs during preferred video programming of the learner.

5. The method of claim 1 wherein a learning period occurs immediately following a psychological event that is beneficial for learning, during the learner's watching of the entertainment video.

6. The method of claim 1 wherein a learning period occurs at a time during the learner's watching of the entertainment video when the learner is at a maximized state of attention.

7. The method of claim 1 wherein a learning period occurs when the learner is in a state of physical exercise while watching the entertainment video.

8. The method of claim 1 wherein the entertainment video is a video game, and a learning period occurs at a natural stopping point during playing of the video game.

9. The method of claim 1 wherein the entertainment video is a video game, and a learning period occurs at a preselected stopping point during playing of the video game.

10. The method of claim 1 wherein the learner is initially engaged in entertainment screen time by means of viewing a monitor coupled to the computer, said method further comprising the steps of the artificial intelligence module:
    monitoring the learner's academic progress and simultaneously monitoring the learner's emotional mood state during the viewing of the entertainment video; and
    using information gathered from the monitoring step to adjust the instruction presented to the learner in a subsequent learning period;
    wherein each learning period is unobtrusively woven into the entertainment video.

11. The method of claim 1 wherein the monitoring step comprises the artificial intelligence module:
    determining whether the learner has mastered a given quantum of content;
    when the module determines that the learner has mastered the given quantum of content, advancing to a next priority area of instruction; and
    when the module determines that the learner has not mastered the given quantum of content, conveying to the learner targeted instruction tailored to the area of deficit, and continuing to impart the instruction pertaining to the area of deficit until the learner has mastered the quantum of content, whereupon the module advances to the next priority area of instruction;
    wherein said next priority area of instruction is unobtrusively woven into the entertainment video.

12. The method of claim 1 wherein the monitoring step comprises the artificial intelligence module:
    determining whether the learner is in a positive mood state or an impaired state;
    when the module determines that the learner is in a positive mood state, the module advances to the next priority area of instruction; and
    when the module determines that the learner is in an impaired state, the module directs the computer back to the entertainment video for refreshment and maintenance of attentional capacity.

13. Artificial intelligence apparatus configured to customize instruction delivered to a learner engaged in learning via a user computer, said apparatus comprising:
    situated on a system computer, a monitoring module configured to monitor the learner's academic progress and to simultaneously monitor the learner's emotional mood state during a given learning period; and coupled to the monitoring module, a presentation module configured to use information gathered from the monitoring module to adjust the instructional content to be presented to the learner, and to present the adjusted instructional content to the learner in a subsequent learning period;

wherein said learning periods are automatically and unobtrusively interwoven into the learner's watching of an entertainment video.

14. Apparatus configured to deliver customized and non-customized instruction to a learner engaged in learning via a user computer, said apparatus comprising:

a module configured to automatically switch the learner from watching an entertainment video into a learning period, where the learning period is automatically and unobtrusively interwoven into the learner's watching of the entertainment video; and a module configured to automatically switch the learner back to the entertainment video at the conclusion of the learning period; wherein the modules are operable within videos streamed from a server, in direct video editing format within videos contained in the user computer, and within videos provided by an existing video manufacturer, editor, distributor, or related video creation entity.

* * * * *